United States Patent
Mizuno

(10) Patent No.: US 7,965,476 B2
(45) Date of Patent: Jun. 21, 2011

(54) CURRENT PRODUCING CIRCUIT, CURRENT PRODUCING METHOD, AND ELECTRONIC DEVICE

(75) Inventor: Nobuyasu Mizuno, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 0 days.

(21) Appl. No.: 12/636,386

(22) Filed: Dec. 11, 2009

(65) Prior Publication Data

US 2010/0156190 A1    Jun. 24, 2010

(30) Foreign Application Priority Data

Dec. 24, 2008   (JP) ................................ 2008-328822

(51) Int. Cl.
*H02H 5/04* (2006.01)
*H02H 7/08* (2006.01)
*H02J 1/00* (2006.01)
*H02J 3/00* (2006.01)

(52) U.S. Cl. .......................................... 361/24; 307/77

(58) Field of Classification Search ................... 361/24; 307/77
See application file for complete search history.

(56) References Cited

U.S. PATENT DOCUMENTS 7,183,848 B2 * 2/2007 Salle et al. .................... 330/254

FOREIGN PATENT DOCUMENTS

| JP | 03-200381 A | 9/1991 |
| JP | 2007-097056 A | 4/2007 |

* cited by examiner

*Primary Examiner* — Dharti H Patel
(74) *Attorney, Agent, or Firm* — Arent Fox LLP

(57) ABSTRACT

A current producing circuit includes a first current source that applies a first current, the first current being changed at a first rate with respect to a temperature, a second current source that applies a second current, the second current being changed at a second rate with respect to the temperature, the second rate being different from the first rate, a third current source that applies a third current, the third current being changed at a third rate with respect to the temperature, a first differential output unit that supplies a first differential current based on a difference between the first current and the second current, and a computing unit that adds or subtracts the first differential current to or from the third current.

12 Claims, 22 Drawing Sheets

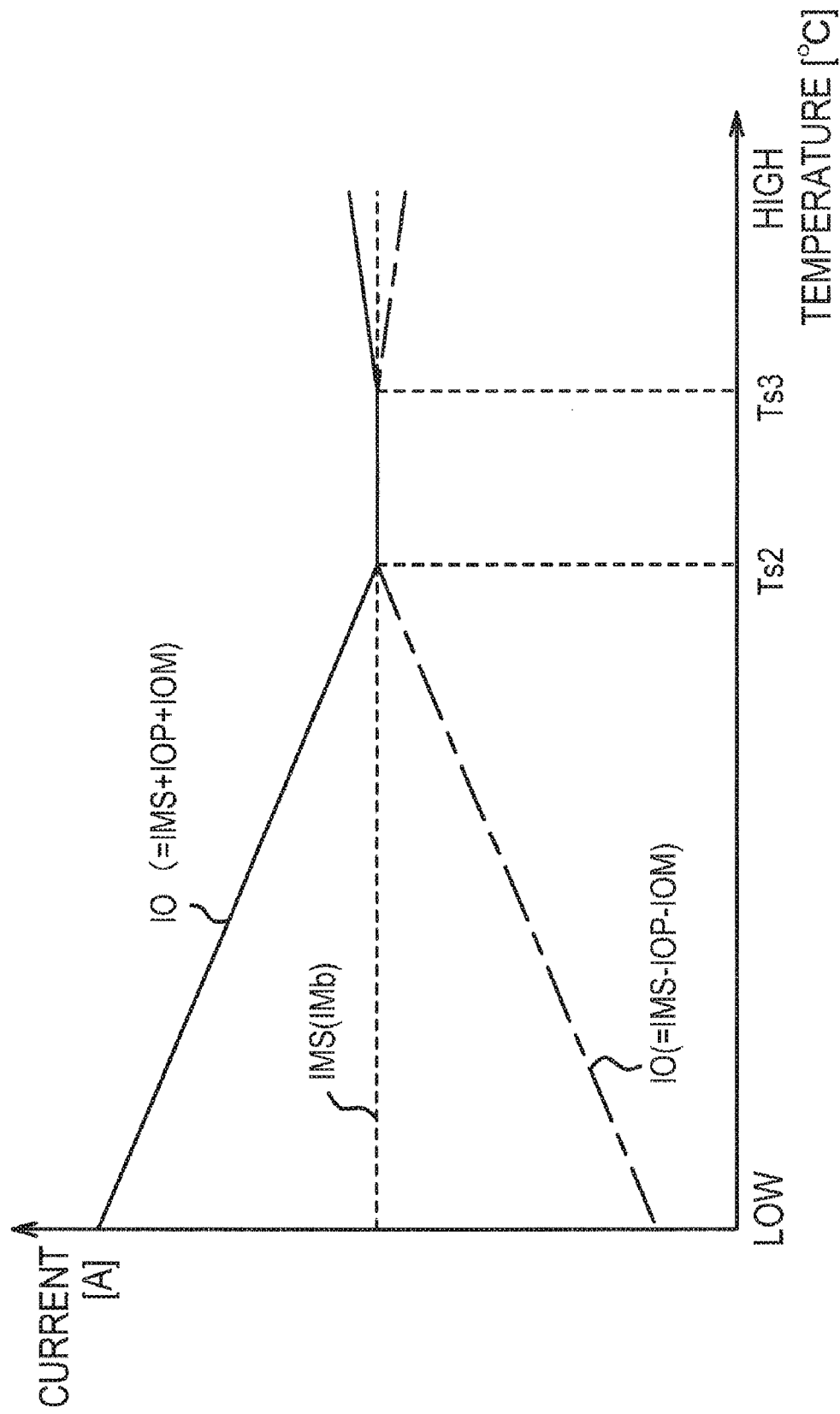

CURRENT PRODUCING CIRCUIT, CURRENT PRODUCING METHOD, AND ELECTRONIC DEVICE

CROSS-REFERENCE TO RELATED APPLICATIONS

This application is based upon and claims the benefit of priority from the prior Japanese Patent Application No. 2008-328822 filed on Dec. 24, 2008, the entire contents of which are incorporated herein by reference.

FIELD

The present invention relates to a current producing circuit, a current producing method, and an electronic device.

BACKGROUND

In a related art, there is a well-known resistance-change type sensor that detects a change in resistance of a sensor element by a predetermined environmental change to measure a physical property of a target. A pressure sensor in which a so-called piezoresistance effect is utilized may be cited as an example of the resistance-change type sensor. In the piezoresistance effect, a resistance value is changed when a stress is applied to a physical body. The pressure sensor is widely used in various fields, for example, an in-car electronic device such as a sheet sensor and a consumer electronic device such as a blood pressure meter. Specifically, in this kind of resistance-change type sensor, as depicted in FIG. 21, a resistance value of a sensor element Rs is changed when an environmental change such as a stress is fed. A change in resistance $\Delta RS$ of the sensor element Rs is converted into a voltage by a current IO supplied from a current source 1, and an amplifier 2 amplifies the converted minute voltage $\Delta Vs$ ($=\Delta Rs \times IO$). The amplified output voltage VOUT (see the following equation) is supplied as a signal proportional to the environmental change to a subsequent-stage system (not depicted).

$$VOUT = G \times \Delta Vs = G \times \Delta Rs \times IO$$

where G is a gain of the amplifier 2. A rate of change of the change in resistance $\Delta Rs$ with respect to the environmental change fluctuates according to a temperature. That is, the change in resistance $\Delta Rs$ of the sensor element Rs has a predetermined temperature characteristic $\alpha$. When the change in resistance $\Delta Rs$ has the temperature characteristic $\alpha$, the output voltage VOUT fluctuates according to the temperature characteristic $\alpha$.

$$VOUT = G \times \Delta Rs \times \alpha \times IO$$

Therefore, even in the same environmental change (for example, the same pressure change), the output voltage VOUT varies depending on an ambient temperature at that time. This causes an error.

For example, as disclosed in Japanese Patent Publication Laid-Open Nos. 03-200381 and 2007-097056, the temperature characteristic of the current IO supplied to the sensor element Rs is set to $1/\alpha$ such that the temperature characteristic $\alpha$ of the change in resistance $\Delta Rs$ is compensated, which allows production of the output voltage VOUT independent of the temperature characteristic $\alpha$ as follows.

$$VOUT = G \times \Delta Rs \times \alpha \times IO/\alpha = G \times \Delta Rs \times IO$$

The current having a temperature characteristic that compensates a signal gradient with respect to a signal having a temperature characteristic changed at a predetermined gradient to the temperature change is produced. Specifically, outputs of a plurality of constant current sources having different temperature characteristics are combined to change a gradient of the temperature characteristic of the constant current source, thereby producing the current having the desired gradient. Thus, in the circuits disclosed in Japanese Patent Publication Laid-Open Nos. 03-200381 and 2007-097056, when the temperature characteristic has the gradient that is linearly changed with respect to the temperature change, the temperature characteristic may be compensated (corrected). However, the temperature characteristic of the signal of the correction target may not simply increase or decrease, but sometimes the temperature characteristic is changed in a curved line with respect to the temperature change. For example, in the pressure sensor in which the piezoresistance effect is utilized, as depicted in FIG. 22, the change in resistance $\Delta RS$ of the sensor element Rs has the temperature characteristic $\alpha$ in which a high temperature side and a low temperature side of a predetermined temperature Ts differ from each other in the gradient due to an influence of a surface impurity concentration of the sensor element. Even in such cases, the circuits disclosed in Japanese Patent Laid-Open Nos. H03-200381 and 2007-097056 produce only the current having a temperature characteristic $\beta$ (see alternate long and short dash line of FIG. 22) of the gradient linearly changed with respect to the temperature change. Therefore, a range on the low temperature side of a predetermined temperature T1 where the temperature characteristic $\alpha$ may not be compensated (corrected) is generated even if the gradient of the temperature characteristic $\beta$ is freely adjusted. In the temperature range, because the influence of the temperature characteristic $\alpha$ may not be removed, the temperature characteristic $\alpha$ of the resistance-change type sensor becomes an error which causes detection accuracy to be lowered. Accordingly, in the complicated temperature characteristic in which the high temperature side and low temperature side of the predetermined temperature differ from each other in the gradient of signal change, it is preferable to produce the current whose temperature characteristic may be corrected with high accuracy.

The resistance-change type sensor is described above only by way of example. A similar problem is generated when the signal of the correction target has an unintended temperature characteristic.

SUMMARY

According to aspects of embodiments, a current producing circuit includes a first current source that applies a first current, the first current being changed at a first rate with respect to a temperature; a second current source that applies a second current, the second current being changed at a second rate with respect to the temperature, the second rate being different from the first rate; a third current source that applies a third current, the third current being changed at a third rate with respect to the temperature; a first differential output unit that supplies a first differential current based on a difference between the first current and the second current; and a computing unit that adds or subtracts the first differential current to or from the third current.

The object and advantages will be realized and attained by means of the elements and combinations particularly pointed out in the claims.

It is to be understood that both the foregoing general description and the following detailed description are exemplary and explanatory and are not restrictive, as claimed.

BRIEF DESCRIPTION OF DRAWINGS

FIG. 15 is a characteristic view depicting an output current;

DESCRIPTION OF EMBODIMENTS

Preferred embodiments will be explained with reference to accompanying drawings.

First Embodiment

Figure 21:
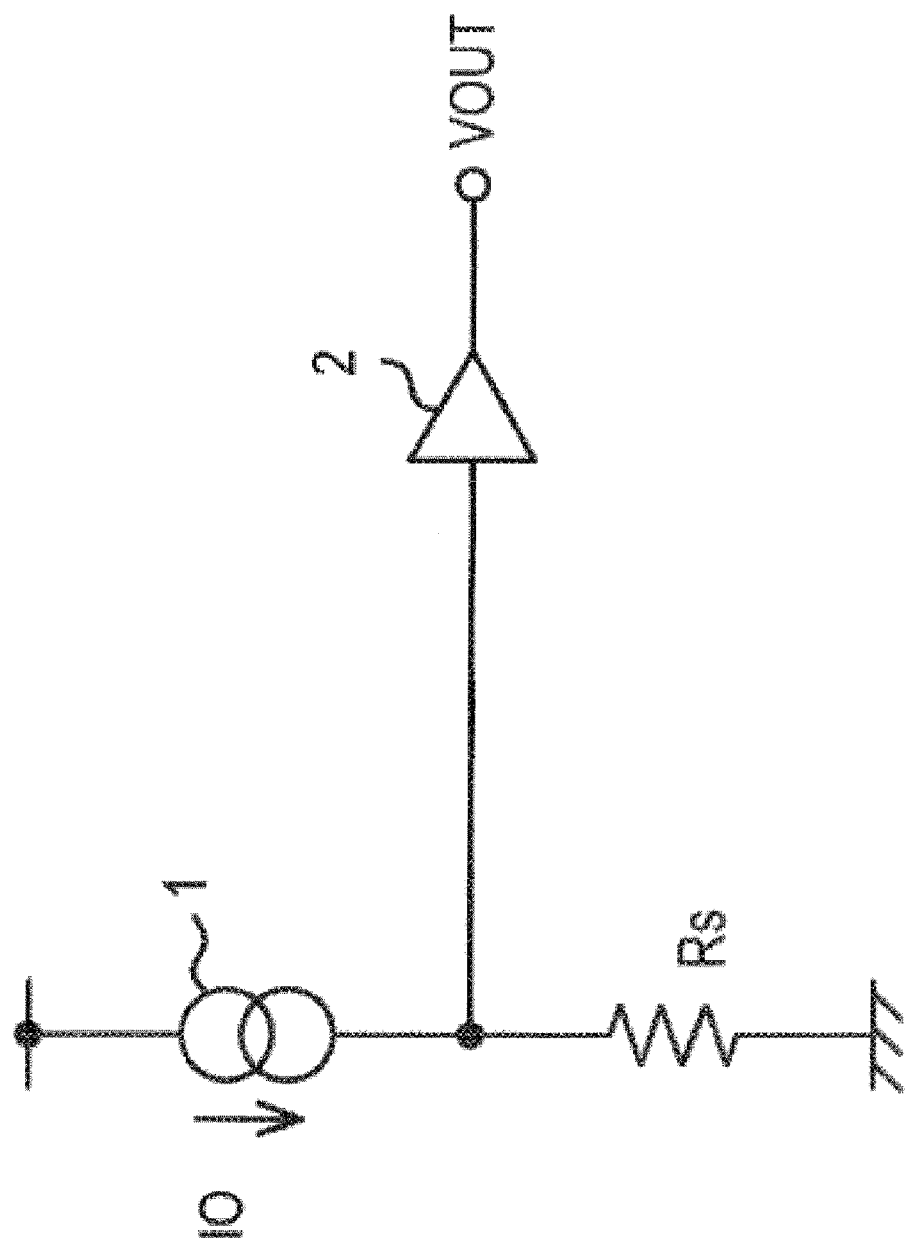
FIG. 21 is a circuit diagram depicting a resistance-change type sensor in a related art.

A first embodiment will be described with reference to FIGS. 1 and 2. In the first embodiment, the components similar to those in FIGS. 21 and 22 are designated by the same reference numerals.

Figure 22:
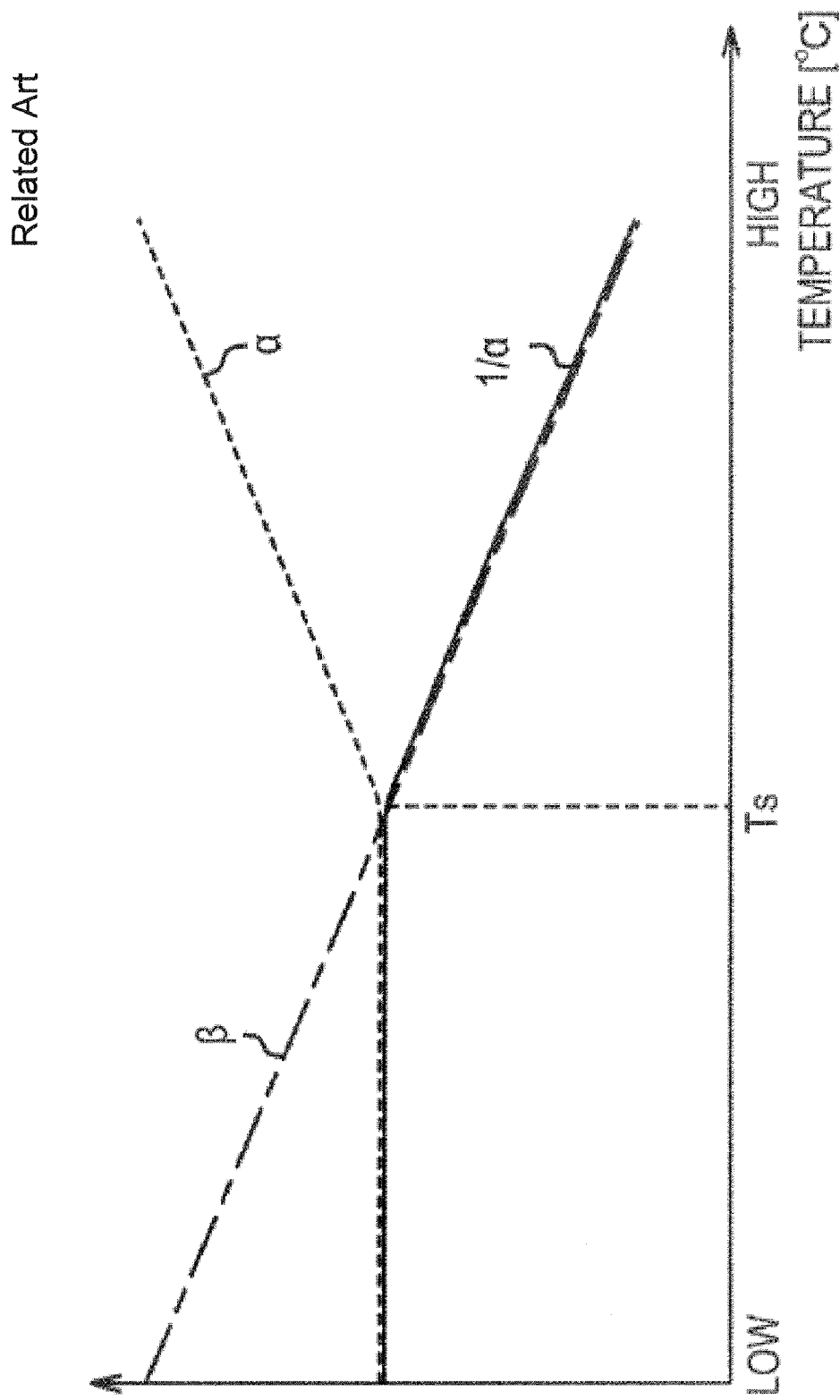
FIG. 22 is a characteristic view for explaining a temperature characteristic in a related art.

A current producing circuit is of the first embodiment produces an output current IO having a temperature characteristic $1/\alpha$ expressed by the solid line of FIG. 22 is approximated by straight lines. The change in resistance $\Delta Rs$ of the sensor element Rs to which the current producing circuit $1a$ supplies the output current IO may include the temperature characteristic $\alpha$ of FIG. 22.

Figure 1:
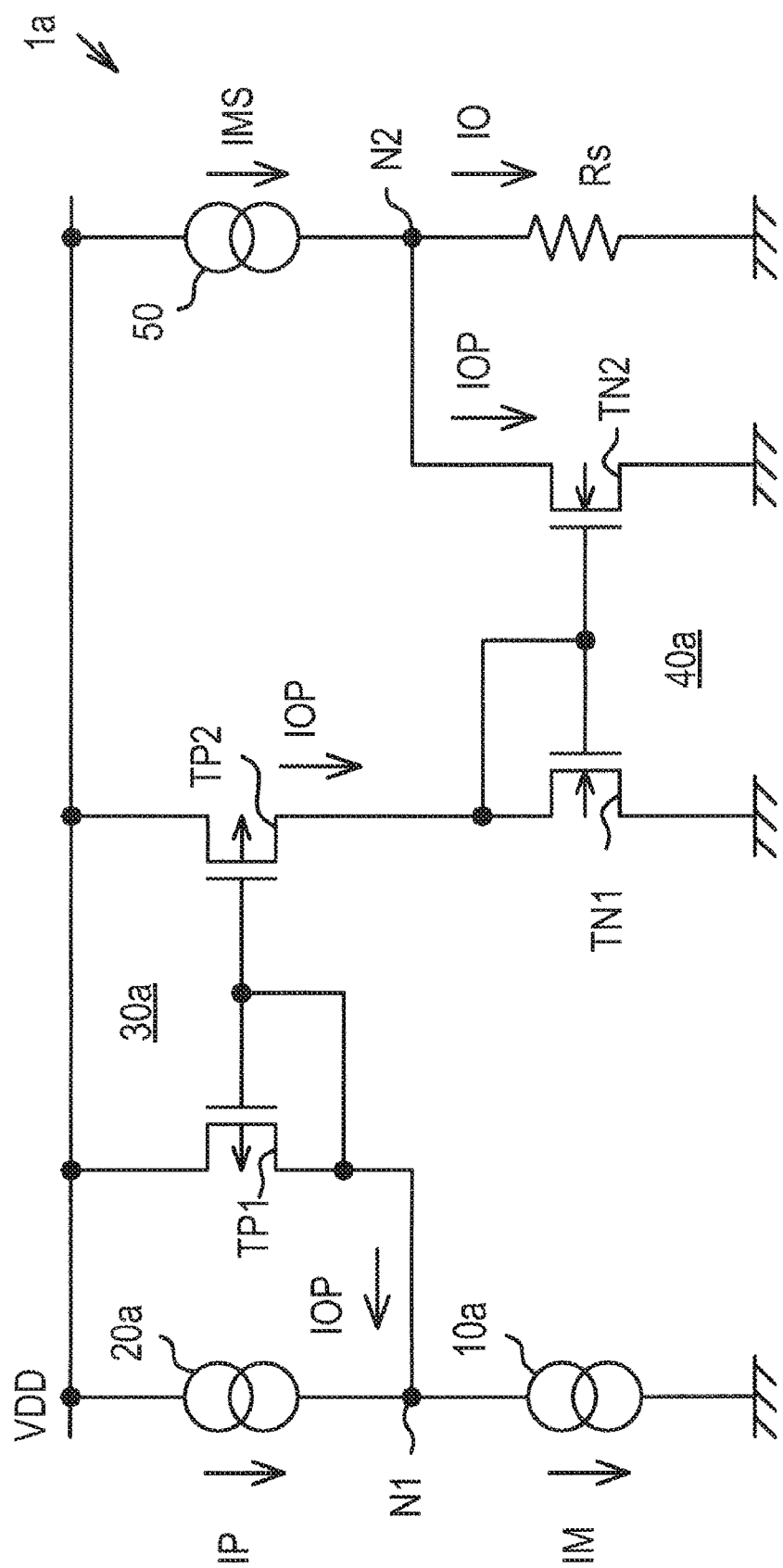
FIG. 1 is a circuit diagram depicting a current producing circuit according to a first embodiment.

As depicted in FIG. 1, the current producing circuit $1a$ may include a first current source $10a$ that applies a first reference current IM, a second current source $20a$ that applies a second reference current IP, current mirror circuits $30a$ and $40a$, and a third current source $50$ that applies a third reference current IMS. The third reference current IMS has $\alpha$ value substantially identical to that of the first reference current IM.

The first current source $10a$ and the second current source $20a$ may be coupled in series between a ground and a high-potential power supply VDD. The first current source $10a$ may draw the first reference current IM from a node N1 between the current sources $10a$ and $20a$. The second current source $20a$ may discharge the second reference current IP to the node N1.

Figure 2A:
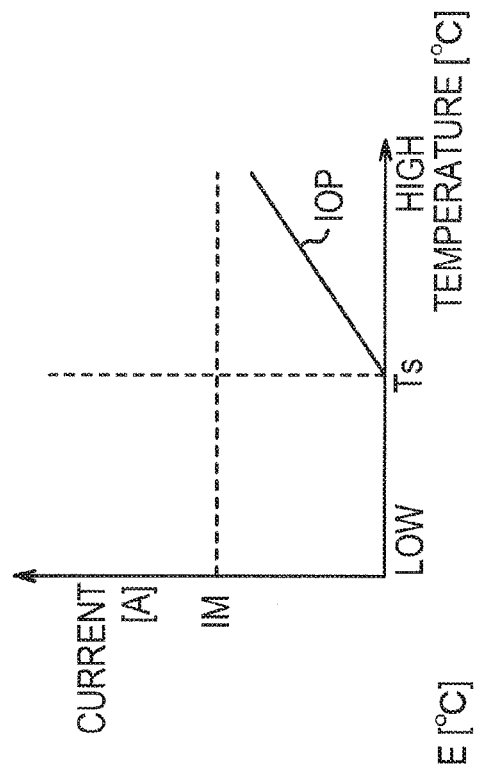
FIGS. 2A to 2C are characteristic views for explaining an output current.
Figure 2B:
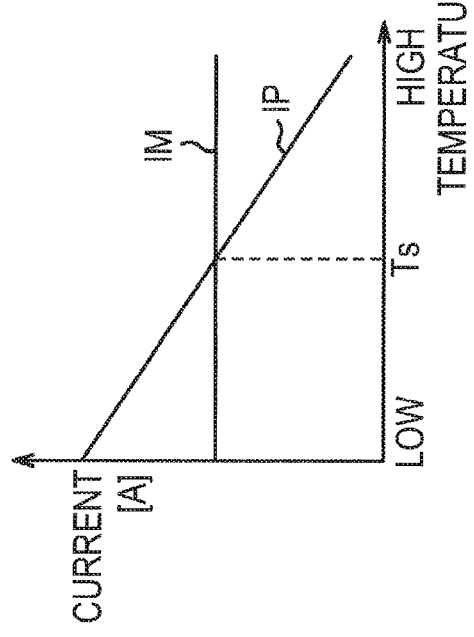

As depicted in FIG. 2A, the first reference current IM (first current) and the second reference current IP (second current) may be different from each other in a gradient of current change with respect to a temperature (temperature gradient). Particularly, the first reference current IM may have a temperature characteristic in which a current is kept constant irrespective of the temperature, and the second reference current IP may have a temperature characteristic that is linearly changed at a specific gradient (for example, $-40\,\mu A/°C$.) with respect to the temperature change. Therefore, a magnitude relationship between current values of the first and second reference currents IM and IP may be inverted at a switching temperature Ts (intersection point) in which the current values of the first and second reference currents IM and IP intersect each other. That is, the second reference current IP becomes larger than the first reference current IM on a low temperature side of the switching temperature Ts. On the contrary, the first reference current IM becomes larger than the second reference current IP on a high temperature side of the switching temperature Ts.

The node N1 between the current sources $10a$ and $20a$ may be coupled to a drain of a PMOS transistor TP1 on an input side of the current mirror circuit $30a$. Accordingly, a first differential current IOP, which is derived by subtracting the second reference current IP from the first reference current IM, flows through the input-side transistor TP1. However, because the input-side transistor TP1 is a MOS transistor, the input-side transistor TP1 does not correspond to bi-directional current polarity. That is, the current mirror circuit $30a$ may mirror only the first differential current IOP applied from the input-side transistor TP1 toward the node N1, but the current mirror circuit $30a$ may not mirror the first differential current IOP applied from the node N1 toward the input-side transistor TP1. Accordingly, on the high temperature side of the switching temperature Ts, that is, in a period in which the first reference current IM becomes larger than the second reference current IP, only a difference between the first reference current IM and the second reference current IP may be applied as the first differential current IOP (=IM−IP≧0) through the input-side transistor TP1 (see FIG. 2B). The first differential current IOP may become zero on the low temperature side of the switching temperature Ts.

The transistor TP1 and a PMOS transistor TP2 may make up the current mirror circuit $30a$. That is, the drain of the input-side transistor TP1 may be coupled to gates of the transistors TP1 and TP2. Sources of the transistors TP1 and TP2 may be coupled to the high-potential power supply VDD, and a drain of the output-side transistor TP2 may be coupled to the current mirror circuit $40a$. The output-side transistor TP2 has an electric characteristic that is substantially identical to that of the input-side transistor TP1, so that the first differential current IOP flowing through the input-side transistor TP1 may flow through the output-side transistor TP2. Thus, the current mirror circuit $30a$ may act as a differential output unit that supplies the first differential current IOP in which the difference between the first and second reference currents IM and IP is computed.

The current mirror circuit 40a may include a pair of NMOS transistors TN1 and TN2 coupled in the current mirror manner. That is, the drain of the input-side transistor TN1 may be coupled to the gates of the transistors TN1 and TN2. The sources of the transistors TN1 and TN2 may be coupled to the ground, the drain of the input-side transistor TN1 may be coupled to the drain of the transistor TP2, and the drain of the output-side transistor TN2 may be coupled to the third current source 50. The output-side transistor TN2 has an electric characteristic that is substantially identical to that of the input-side transistor TN1, so that the first differential current IOP flowing through the input-side transistor TN1 may flow through the output-side transistor TN2. Particularly, the output-side transistor TN2 may draw the first differential current IOP from the node N2 between the output-side transistor TN2 and the third current source 50.

Figure 2C:
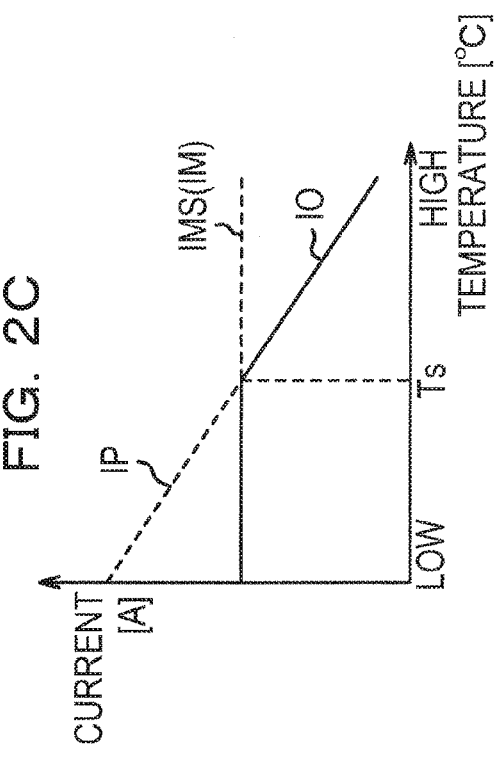

The third current source 50 may discharge the third reference current IMS (third current) to a node N2. As depicted in FIG. 2C, the thus configured current producing circuit 1a may produce an output current IO (=IMS−IOP) which is derived by subtracting the first differential current IOP from the third reference current IMS. That is, the output current IO may have a temperature characteristic in which the current is kept constant irrespective of the temperature on the low temperature side of the switching temperature Ts, and the output current IO may have a temperature characteristic that is linearly changed at the gradient of −40 μA/° C. with respect to the temperature change on the high temperature side of the switching temperature Ts. In other words, the output current IO may have the temperature characteristic (temperature characteristic in which the temperature characteristic 1/α of FIG. 22 is approximated by two straight lines) in which the temperature gradient is changed at the switching temperature Ts (changing point) at which the current values of the first and second reference currents IM and IP intersect each other. In the current producing circuit 1a, even if the temperature gradient is changed at the switching temperature Ts in the temperature characteristic α of the change in resistance ΔRs of the sensor element Rs, the temperature characteristic of the output current IO may be set so as to counteract (correct) the temperature characteristic α. The current producing circuit 1a may supply the output current IO to the sensor element Rs coupled to the node N2, thereby improving the correction accuracy of the temperature characteristic α of the change in resistance ΔRs of the sensor element Rs.

The first differential current IOP (=IM−IP≧0), which is derived by subtracting the second reference current IP from the first reference current IM, is subtracted from the third reference current IMS, which allows the production of the output current IO having the temperature characteristic. In the temperature characteristic of the output current IO, the temperature gradient is changed at the switching temperature Ts in which the current values of the first and second reference currents IM and IP intersect each other. Accordingly, the temperature characteristic of the change in resistance ΔRs of the sensor element Rs may be corrected by the temperature characteristic of the output current IO to improve the correction accuracy thereof.

Second Embodiment

A second embodiment will be described with reference to FIGS. 3 to 6. In the second embodiment, the components substantially identical to those in FIGS. 1 and 2 are designated by the same reference numerals, and the detailed description thereof will not be repeated here.

Figure 3:
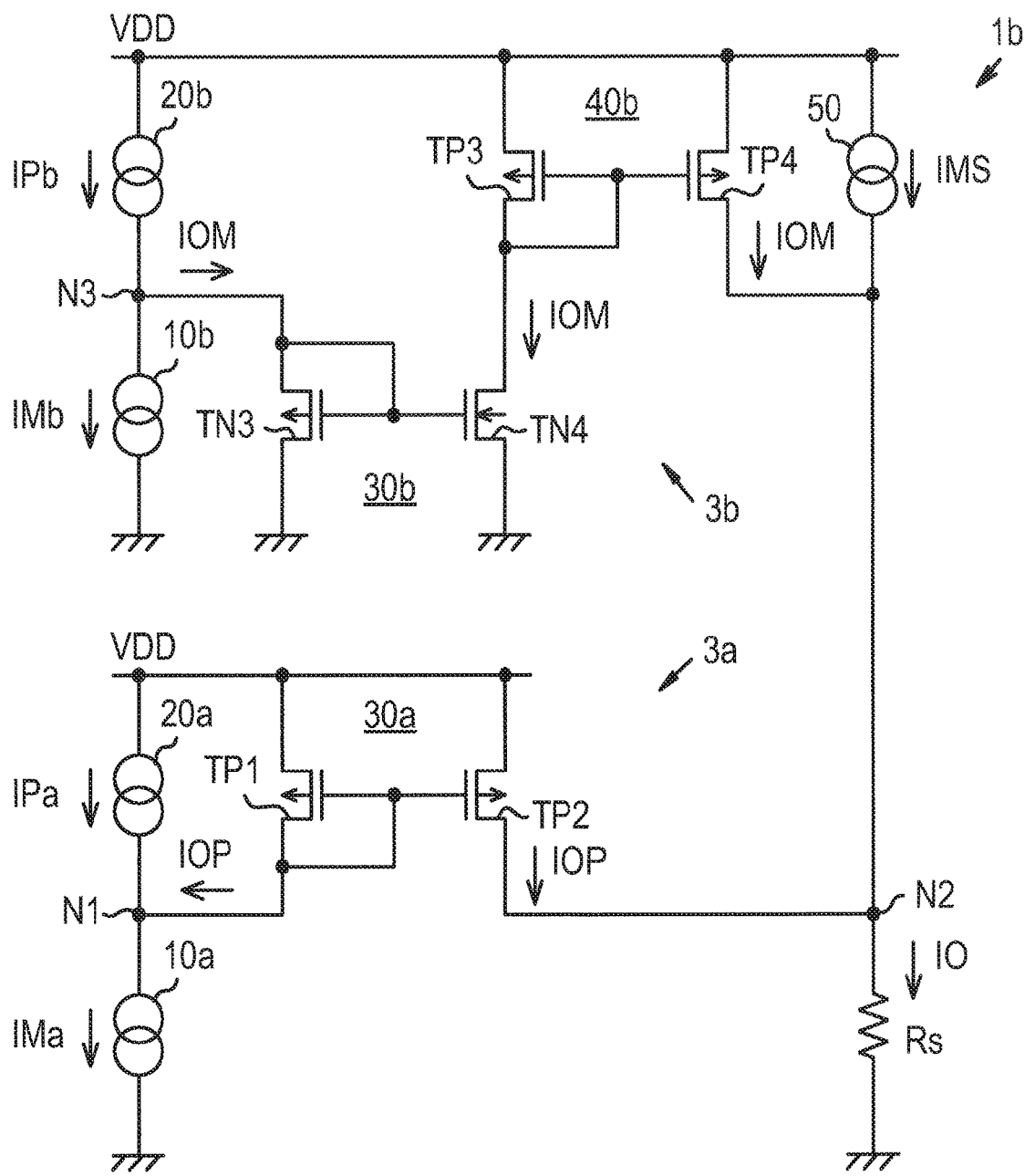
FIG. 3 is a principle diagram depicting a current producing circuit according to a second embodiment.
Figure 6A:
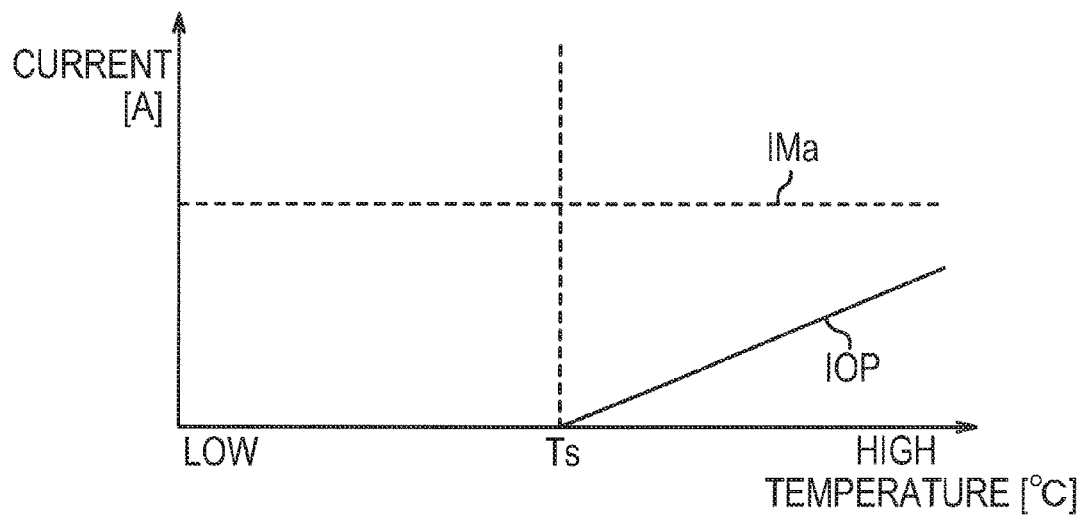
FIGS. 6A to 6C are characteristic views for explaining an output current.
Figure 6B:
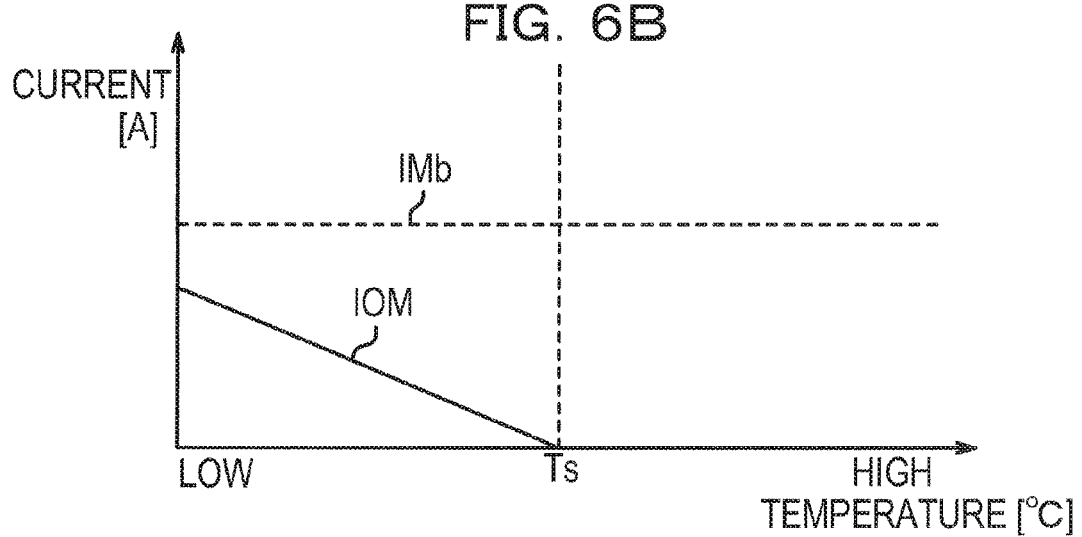
Figure 6C:
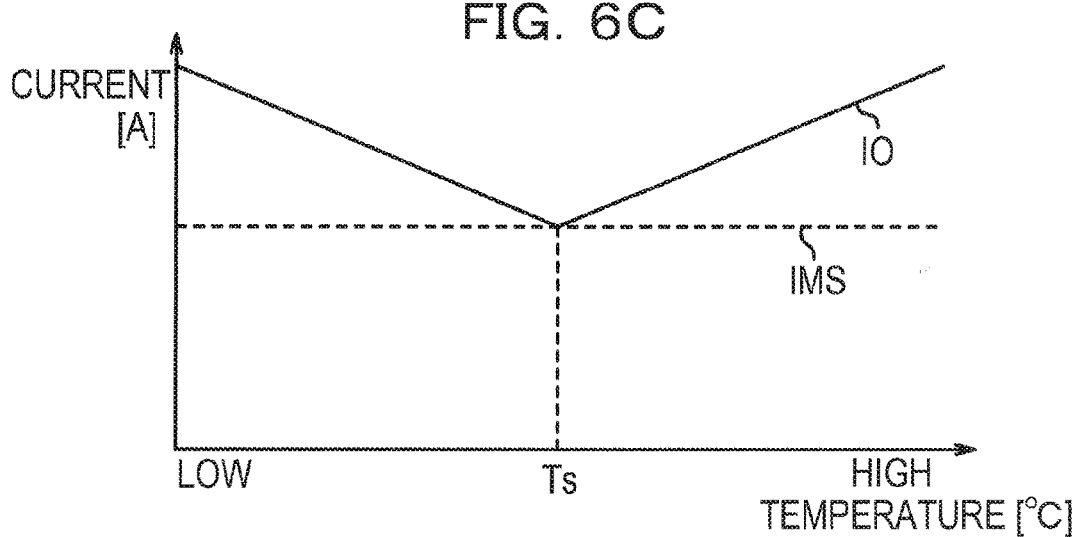

FIG. 3 is a diagram for explaining a principle of a current producing circuit 1b that produces the output current IO having a V-shape temperature characteristic as depicted in FIG. 6C. As depicted in FIG. 3, the current producing circuit 1b may include a first differential current producing circuit 3a that produces the differential current on the high temperature side of the switching temperature Ts, a second differential current producing circuit 3b that produces the differential current on the low temperature side of the switching temperature Ts, and the third current source 50.

The first differential current producing circuit 3a may include the first current source 10a that applies a first reference current IMa (first current) substantially identical to the first reference current IM, the second current source 20a that applies a second reference current IPa (second current) substantially identical to the second reference current IP, and the current mirror circuit 30a. The first differential current producing circuit 3a may be different from the differential current producing circuit of the first embodiment in that the current mirror circuit 40a is removed, but other configurations are substantially identical. That is, the first differential current producing circuit 3a may discharge the first differential current IOP (=IMa−IPa≧0) of FIG. 6A to the node N2. The current mirror circuit 30a of the first differential current producing circuit 3a may act as a difference output unit and a computing unit that adds the first differential current IOP to the third reference current IMS.

On the other hand, the second differential current producing circuit 3b may include a fourth current source 10b that applies a fourth reference current IMb substantially identical to the first reference current IM, a fifth current source 20b that applies a fifth reference current IPb substantially identical to the second reference current IP, and current mirror circuits 30b and 40b.

The fourth current source 10b and the fifth current source 20b may be coupled in series between the ground and the high-potential power supply VDD. The fourth current source 10b may draw the fourth reference current IMb (fourth current) from a node N3 between the current sources 10b and 20b. The fifth current source 20b may discharge the fifth reference current IPb (fifth current) to the node N3.

The node N3 may be coupled to a drain of an NMOS transistor TN3 on the input side of the current mirror circuit 30b. Accordingly, a second differential current IOM in which the fourth reference current IMb is subtracted from the fifth reference current IPb may flow through the input-side transistor TN3. However, because the input-side transistor TN3 is a MOS transistor, the input-side transistor TN3 does not correspond to the bi-directional current polarity. Accordingly, on the low temperature side of the switching temperature Ts, that is, in a period in which the fifth reference current IPb becomes larger than the fourth reference current IMb, only a difference between the fifth reference current IPb and the fourth reference current IMb may flow as the second differential current IOM (=IPb−IMb≧0) through the input-side transistor TN3 (see FIG. 6B). The second differential current IOM may become zero on the high temperature side of the switching temperature Ts.

The transistor TN3 and an NMOS transistor TN4 may make up the current mirror circuit 30b. The drain of the output-side transistor TN4 is coupled to the current mirror circuit 40b. The output-side transistor TN4 has an electric characteristic that is substantially identical to that of the input-side transistor TN3. Accordingly, the second differential current IOM flowing through the input-side transistor TN3 may flow through the output-side transistor TN4. Thus, the current mirror circuit 30b may act as a differential output unit that supplies the second differential current IOM in which the difference between the fourth and fifth reference currents IMb and IPb is computed.

The current mirror circuit 40b includes a pair of PMOS transistors TP3 and TP4 coupled in the current mirror manner. The drain of the input-side transistor TP3 is coupled to the drain of the transistor TN4, and the drain of the output-side transistor TP4 is coupled to the third current source 50. The output-side transistor TP4 has an electric characteristic that is substantially identical to that of the input-side transistor TP3. Accordingly, the second differential current IOM flowing through the input-side transistor TP3 may flow through the output-side transistor TP4. Particularly, the output-side transistor TP4 may discharge the second differential current IOM to the node N2.

As depicted in FIG. 6C, in the current producing circuit 1b, the first differential current IOP, and the second differential current IOM may be added to the third reference current IMS to produce the output current IO (=IMS+IOP+IOM) having the V-shape temperature characteristic in which the temperature gradient is changed in a reverse direction at the switching temperature Ts (changing point). That is, the output current IO may have the temperature characteristic (in the second embodiment, the temperature characteristic possessed by the fifth reference current IPb) possessed by the second differential current IOM on the low temperature side of the switching temperature Ts. The output current IO may have the temperature characteristic (in the second embodiment, the temperature characteristic having the gradient in the opposite direction to the temperature gradient of the second reference current IPa) possessed by the first differential current IOP on the high temperature side of the switching temperature Ts.

Thus, the current producing circuit 1b includes the first differential current producing circuit 3a that produces the first differential current IOP on the high temperature side of the switching temperature Ts and the second differential current producing circuit 3b that produces the second differential current IOM on the low temperature side of the switching temperature Ts, so that the output current IO having the complicated temperature characteristic may be produced.

Figure 4:
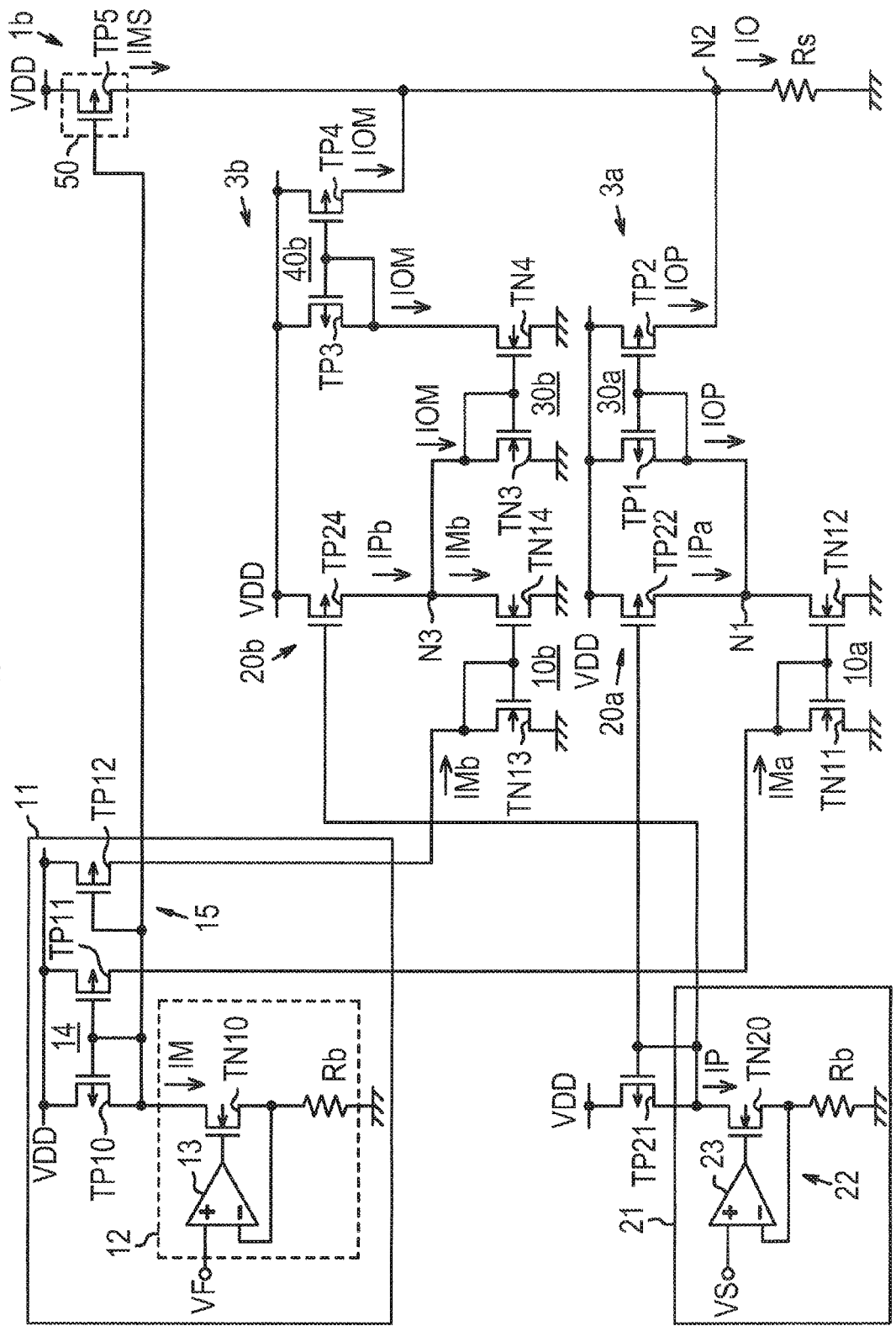
FIG. 4 is a circuit diagram depicting the current producing circuit of the second embodiment.

FIG. 4 is a circuit diagram depicting a specific configuration of the current producing circuit 1b of the second embodiment.

As depicted in FIG. 4, the current producing circuit 1b may include the first differential current producing circuit 3a, the second differential current producing circuit 3b, a first control circuit 11, a second control circuit 21, and the current source 50.

Figure 5A:
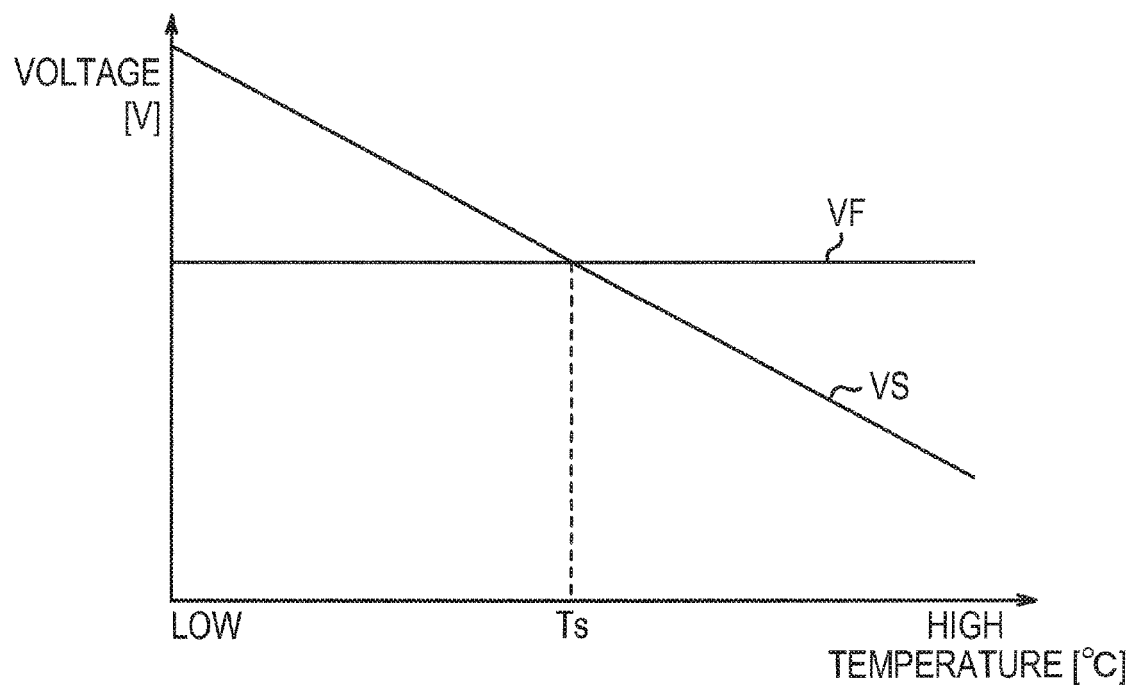
FIGS. 5A to 5B are characteristic views for explaining a reference voltage and a reference current.
Figure 5B:
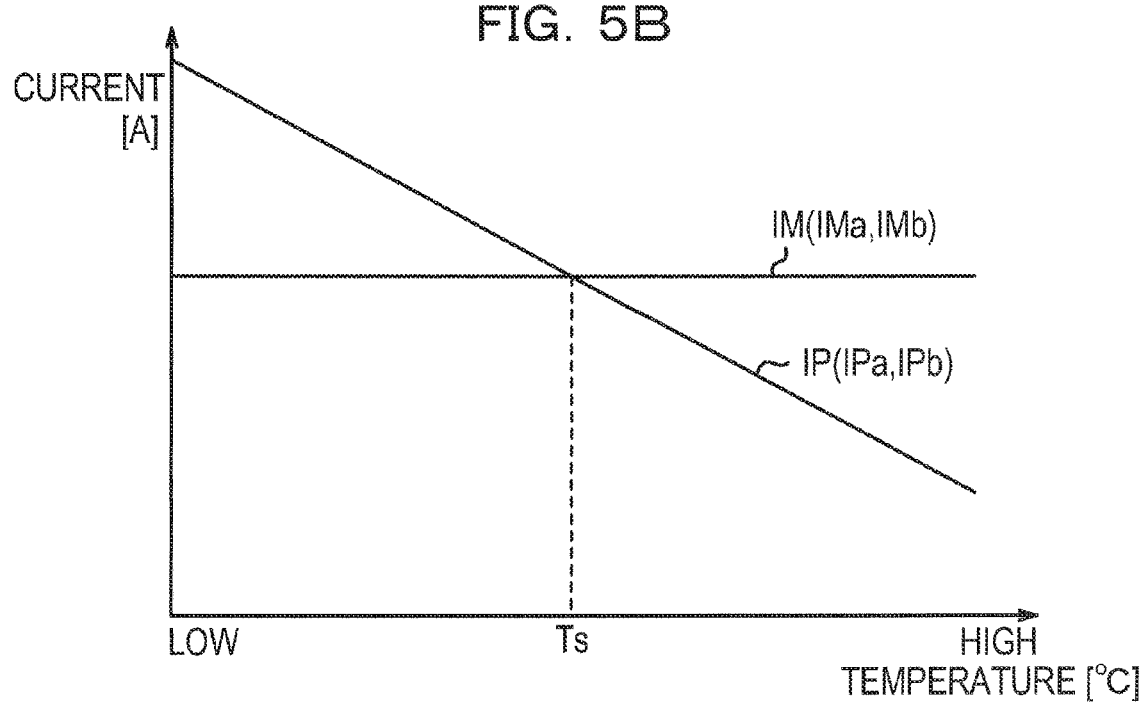

The first control circuit 11 may be a circuit that controls the first and fourth current sources 10a and 10b such that the first and fourth current sources 10a and 10b apply the first and fourth reference currents IMa and IMb, respectively. The first control circuit 11 may have a constant current circuit 12 and current mirror circuits 14 and 15. In an operational amplifier 13 of the constant current circuit 12, a first reference voltage VF may be fed into a non-inverting input terminal. The output of the operational amplifier 13 may be supplied to a gate of an NMOS transistor TN10. The source of the transistor TN10 is coupled to the ground through a voltage-current conversion resistor Rb, and the drain of the transistor TN10 is coupled to a drain of a PMOS transistor TP10 of the current mirror circuits 14 and 15. The coupling point of the transistor TN10 and the resistor Rb may be coupled to an inverting input terminal of the operational amplifier 13. In the thus configured constant current circuit 12, because a potential at the coupling point of the transistor TN10 and the resistor Rb is controlled so as to be substantially equal to the first reference voltage VF, the first reference current IM expressed by the following equation may flow through the transistor TN10.

$$IM = VF/Rb$$

Where the first reference voltage VF may be a voltage produced by, for example, a bandgap reference voltage and, as depicted in FIG. 5A, the first reference voltage VF may have the temperature characteristic in which a voltage is kept constant irrespective of the temperature. Therefore, as depicted in FIG. 5B, the first reference current IM produced from the first reference voltage VF has the temperature characteristic in which a voltage is kept constant irrespective of the temperature.

The PMOS transistor TP10 and the PMOS transistor TP11 may make up the current mirror circuit 14, and the PMOS transistor TP10 and the PMOS transistor TP12 may make up the current mirror circuit 15. Each of the output-side transistors TP11 and TP12 has the electric characteristic that is substantially identical to that of the input-side transistor TP10. Accordingly, the output-side transistors TP11 and TP12 may apply the first and fourth reference currents IMa and IMb to the first and fourth current sources 10a and 10b, respectively. The first and fourth reference currents IMa and IMb are substantially identical to the current flowing through the input-side transistor TP10, that is, the first reference current IM produced by the constant current circuit 12.

The first current source 10a may include a pair of NMOS transistors TN11 and TN12 coupled in a current mirror manner. The drain of the input-side transistor TN11 may be coupled to the drain of the transistor TP11, and the drain of the output-side transistor TN12 may be coupled to the node N1. The output-side transistor TN12 has the electric characteristic that is substantially identical to that of the input-side transistor TN11. Accordingly, the first reference current IMa flowing through the input-side transistor TN11 may flow through the output-side transistor TN12. Particularly the output-side transistor TN12 (current source 10a) may draw the first reference current IMa from the node N1.

The fourth current source 10b may include a pair of NMOS transistors TN13 and TN14 coupled in the current mirror manner. The drain of the input-side transistor TN13 may be coupled to the drain of the transistor TP12, and the drain of the output-side transistor TN14 may be coupled to the node N3. The output-side transistor TN14 has the electric characteristic that is substantially identical to that of the input-side transistor TN13. Accordingly, the fourth reference current IMb flowing through the input-side transistor TN13 may flow through the output-side transistor TN14. Particularly the output-side transistor TN14 (current source 10b) may draw the fourth reference current IMb from the node N3.

On the other hand, the second control circuit 21 may be a circuit that controls the second and fifth current sources 20a and 20b such that the second and fifth current sources 20a and 20b apply the second and fifth reference currents IPa and IPb, respectively. The second control circuit 21 may include a constant current circuit 22. In an operational amplifier 23 of the constant current circuit 22, a second reference voltage VS is fed into the non-inverting input terminal. The output of the operational amplifier 23 is supplied to a gate of an NMOS transistor TN20. The source of the transistor TN20 may be coupled to the ground through the resistor Rb, and the drain of the transistor TN20 may be coupled to a drain of a PMOS transistor TP21 on the input sides of the second and fifth current sources 20a and 20b. Because the potential at the coupling point of the transistor TN20 and the resistor Rb is controlled so as to be substantially equal to the second reference voltage VS, the second reference current IP expressed by the following equation may flow through the transistor TN20.

$IP=VS/Rb$

The second reference voltage VS may be a voltage produced by, for example, a forward voltage at a PN junction portion of a transistor or a diode and, as depicted in FIG. 5A, the second reference voltage VS may have the temperature characteristic that is linearly changed at a specific gradient (for example, −4 mV/° C.) with respect to the temperature change. The second reference voltage VS and the first reference voltage VF may be different from each other in a gradient of voltage change with respect to a temperature (temperature gradient). Therefore, the magnitude relationship between the voltage values of the first and second reference voltage VF and VS may be inverted at the switching temperature Ts in which the voltage values of the first and second reference voltage VF and VS intersect each other. That is, the second reference voltage VS becomes larger than the first reference voltage VF on the low temperature side of the switching temperature Ts, and the first reference voltage VF becomes larger than the second reference voltage VS on the high temperature side of the switching temperature Ts.

In the second embodiment, resistance values of the resistors Rb of the constant current circuits 12 and 22 are substantially identical to each other, and the resistors Rb has the resistance value of, for example, 100Ω. Therefore, as depicted in FIG. 5B, the second reference current IP produced from the second reference voltage VS may have the temperature characteristic that changes linearly at the gradient of, for example, −40 μA/° C. with respect to the temperature change.

The PMOS transistors TP21 and TP22 coupled in the current mirror manner may make up the second current source 20a, and the PMOS transistors TP21 and TP24 coupled in a current mirror manner may make up the fifth current source 20b. The output-side transistors TP22 and TP24 have the electric characteristic that is substantially identical to that of the input-side transistor TP21. Accordingly, the output-side transistors TP22 and TP24 may apply the second and fifth reference currents IPa and IPb to the nodes N1 and N3. The second and fifth reference currents IPa and IPb have the same current flowing through the input-side transistor TP21, that is, the same value as the second reference current IP produced by the constant current circuit 22. Particularly the output-side transistor TP22 (second current source 20a) may discharge the second reference current IPa to the node N1, and the output-side transistor TP24 (fifth current source 20b) may discharge the fifth reference current IPb to the node N3.

As depicted in FIG. 3, the current mirror circuit 30a coupled to the node N1 may discharge the first differential current IOP (=IMa−IPa≧0) which is derived by subtracting the second reference current IPa from the first reference current IMa to the node N2 (see FIG. 6A). The current mirror circuits 30b and 40b coupled to the node N3 may discharge the second differential current IOM (=IPb−IMb≧0) which is derived by subtracting the fourth reference current IMb from the fifth reference current IPb to the node N2 (see FIG. 6B).

A PMOS transistor TP5 operated as the third current source 50 may be coupled in a current mirror manner to the PMOS transistor TP10. The transistor TP5 has the electric characteristic that is substantially identical to that of the input-side transistor TP10, so that the PMOS transistor TP5 may discharge the third reference current IMS that is substantially identical to the first reference current IM flowing through the input-side transistor TP10 to the node N2. Therefore, as depicted in FIG. 6C, the first differential current IOP and the second differential current IOM may be added to the third reference current IMS to produce the output current IO (=IMS+IOP+IOM) having the V-shape temperature characteristic.

In the current producing circuit 1b, because the first and second differential currents IOP and IOM are added to the third reference current IMS, the transistors TP2, TP4, and TP5 coupled to the node N2 may include PMOS transistors that are substantially the same conductive type.

The first differential current IOP (=IMa−IPa≧0), which is derived by subtracting the second reference current IPa from the first reference current IMa, and the second differential current IOM (=IPb−IMb≧0), which is derived by subtracting the fourth reference current IMb from the fifth reference current IPb, are added to the third reference current IMS. Therefore, the output current IO having the V-shape temperature characteristic may be produced. In the V-shape temperature characteristic of the output current IO, the temperature gradient is changed in the reverse direction at the switching temperature Ts in which the current values of the first reference current IMa (fourth reference current IMb) and second reference current IPa (fifth reference current IPb) intersect each other. Accordingly, even if the change in resistance ΔRs of the sensor element Rs has a complicated chevron-shape temperature characteristic, the temperature characteristic of the change in resistance ΔRs of the sensor element Rs may be corrected by the temperature characteristic of the output current IO to improve the correction accuracy.

Figure 7A:
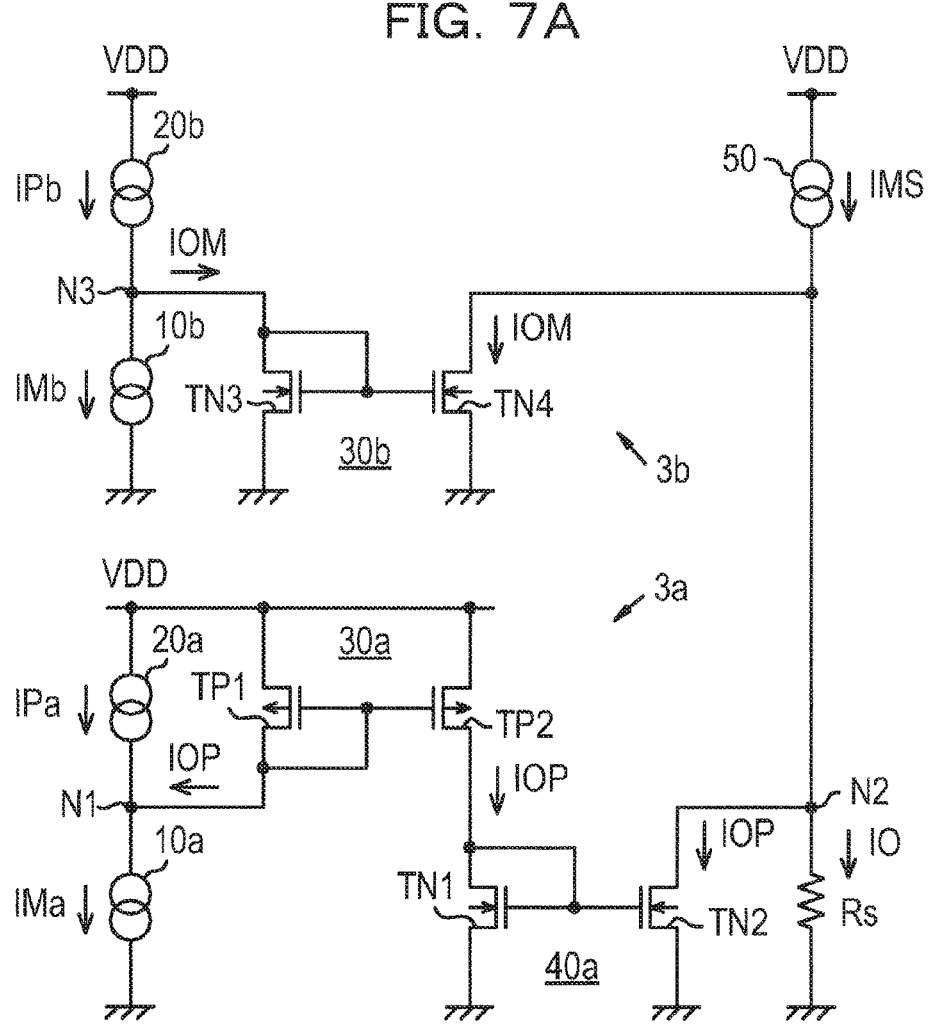
FIGS. 7A and 7B are views for explaining a current producing circuit according to a modification.
Figure 7B:
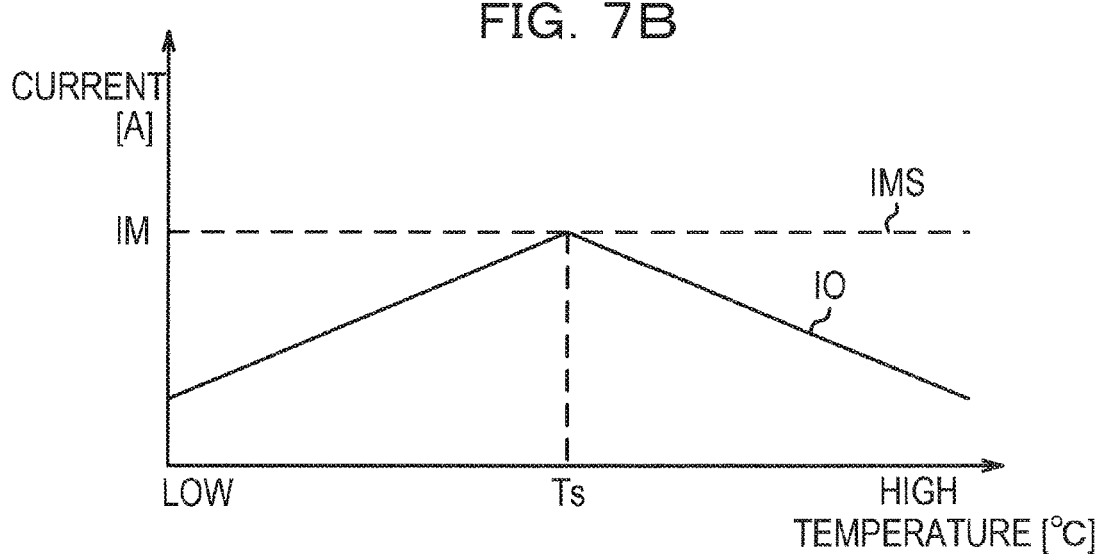

The second embodiment may be implemented in the following mode in which the second embodiment is appropriately changed. In the second embodiment, the first differential current producing circuit 3a is configured such that the first differential current IOP is discharged to the node N2, and the second differential current producing circuit 3b is configured such that the second differential current IOM is discharged to the node N2. Additionally, as depicted in FIG. 7A, the first differential current producing circuit 3a is configured such that the first differential current IOP is drawn from the node N2, and the second differential current producing circuit 3b is configured such that the second differential current IOM is drawn from the node N2. That is, the first differential current producing circuit 3a may include the current mirror circuits 30a and 40a, and the output-side transistor TN2 of the current mirror circuit 40a may draw the first differential current IOP from the node N2. The second differential current producing circuit 3b may include the current mirror circuit 30b, and the output-side transistor TN4 of the current mirror circuit 30b may draw the second differential current IOM from the node N2. Therefore, as depicted in FIG. 7B, the first and second differential currents IOP and IOM may be subtracted from the third reference current IMS, and the output current IO (=IMS−IOP−IOM) having the chevron-shape temperature characteristic may be produced.

Alternatively, for example, the first differential current producing circuit 3a may be configured such that the first differential current IOP is drawn from the node N2, and the second differential current producing circuit 3b may be configured such that the second differential current IOM is discharged to the node N2. In such cases, preferably the third reference current IMS has the temperature characteristic that is linearly changed at the predetermined gradient.

Third Embodiment

A third embodiment will be described with reference to FIGS. 8 to 12. In the third embodiment, the components substantially identical to those in FIGS. 1 to 7 are designated by the same reference numerals, and the detailed description thereof will not be repeated here.

A current producing circuit 1c of the third embodiment produces the output current IO in which the temperature gradient on the high temperature side of the changing point (switching temperature) and the temperature gradient on the low temperature side may be separately controlled. In the current producing circuit 1c, the second and fifth reference currents IPa and IPb separately produced from the reference voltages having different temperature gradients may be supplied to the first and second differential current producing circuits 3a and 3b. A specific circuit configuration will be described below.

Figure 8:
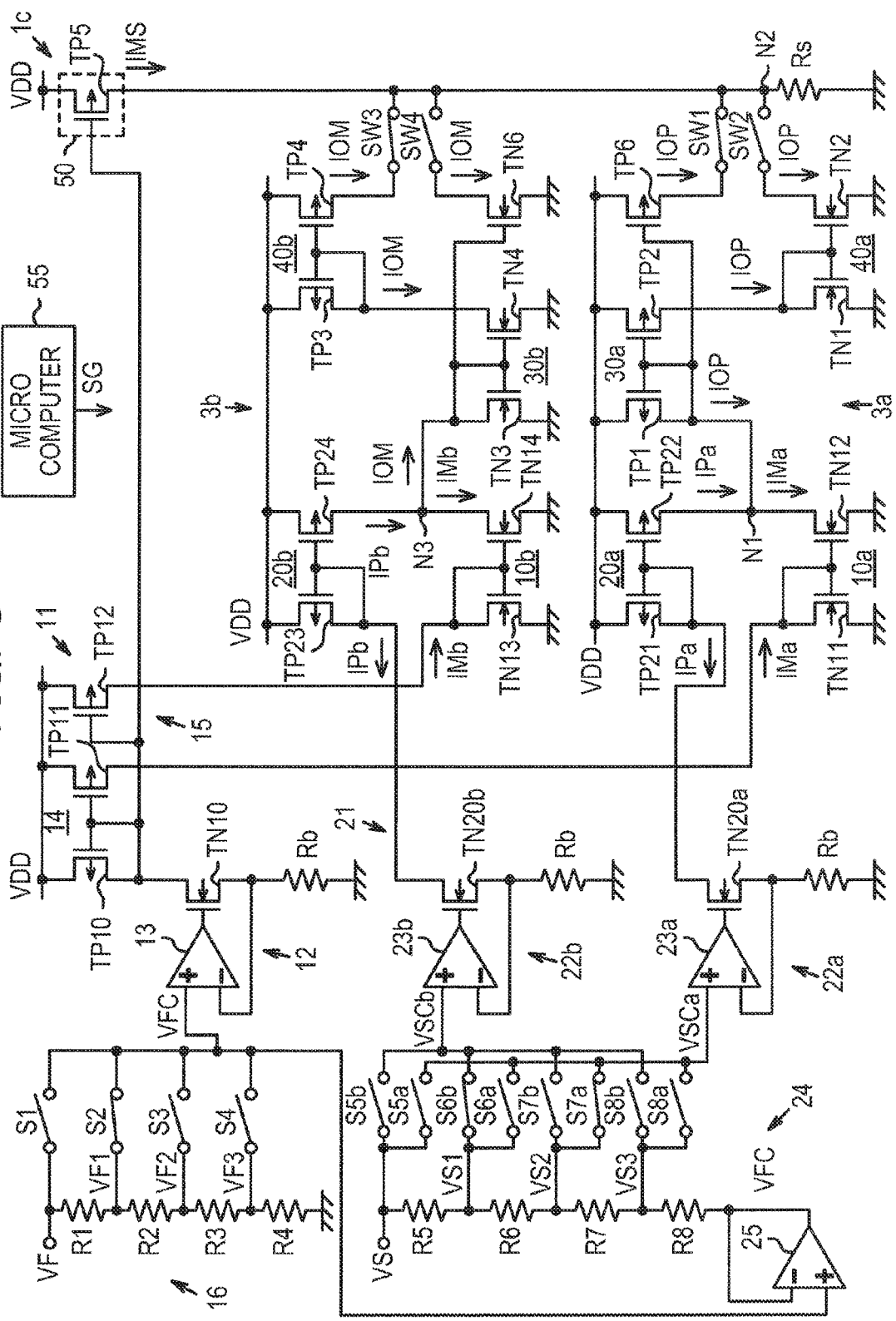
FIG. 8 is a circuit diagram depicting a current producing circuit according to a third embodiment.

As depicted in FIG. 8, the current producing circuit 1c may include the first and second differential current producing circuits 3a and 3b, the first control circuit 11, the second control circuit 21, switches SW1 to SW4, and the third current source 50.

The first control circuit 11 may include the constant current circuit 12, the current mirror circuits 14 and 15, and a first reference voltage producing circuit 16. The first reference voltage producing circuit 16 may include a voltage dividing circuit. The voltage dividing circuit includes a plurality of resistors R1 to R4 (in FIG. 8, four) that are coupled in series between the ground and the input terminal to which the first reference voltage VF is supplied. The resistors R1 to R4 may act as a voltage dividing resistor that divides a potential difference between the ground and the first reference voltage VF.

The switch S1 may be coupled to the input terminal to which the first reference voltage VF is supplied. The switch S1 directly supplies the first reference voltage VF as a first correction reference voltage VFC. The switches S2 to S4 may be coupled to the coupling points of the resistors R1 to R4. The switches S2 to S4 selectively supply divided voltages VF1 to VF3 of the coupling points as the first correction reference voltage VFC. The outputs of the switches S1 to S4 may be coupled to the non-inverting input terminal of the operational amplifier 13.

Figure 9A:
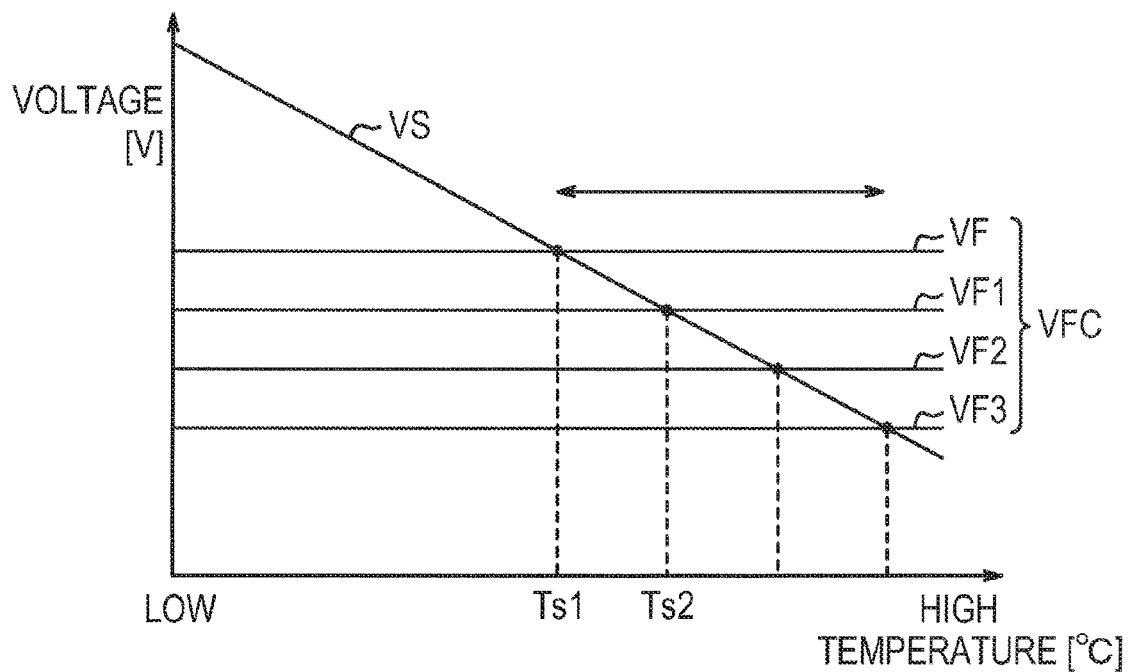
FIGS. 9A and 9B are characteristic views for depicting a reference voltage.
Figure 9B:
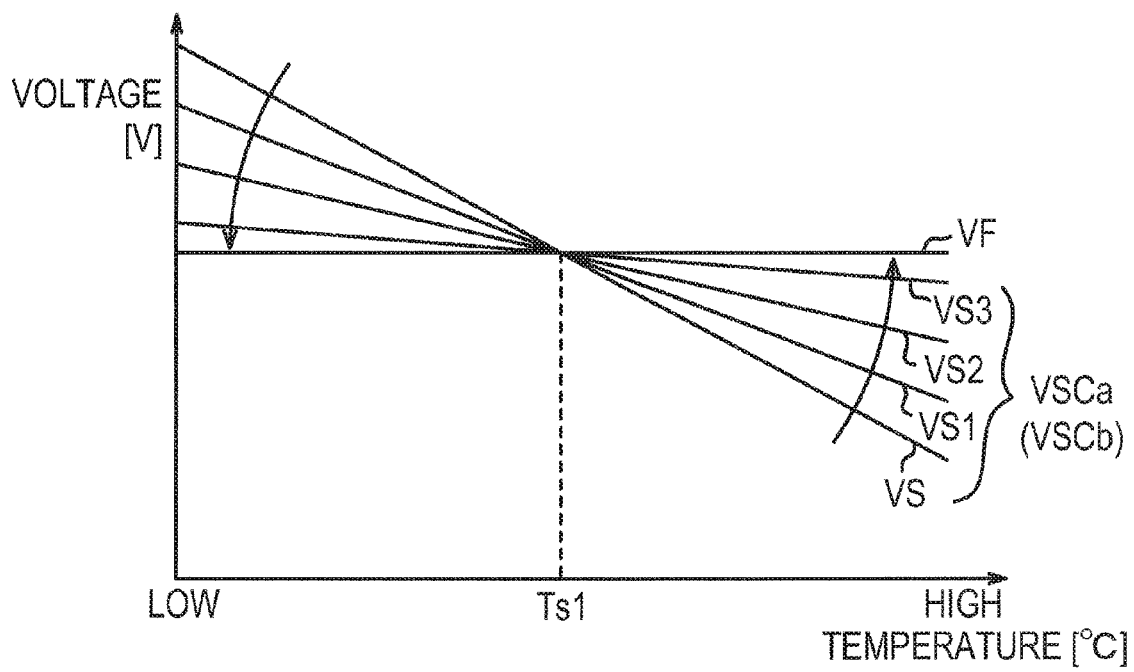

In the thus configured first reference voltage producing circuit 16, one of the switches S1 to S4 is turned on, the voltage corresponding to the turned-on switch in the voltages VF and VF1 to VF3 may be supplied as the first correction reference voltage VFC to the non-inverting input terminal of the operational amplifier 13. A voltage dividing ratio of the voltage dividing circuit is adjusted by selectively switching the switches S1 to S4, so that the voltage value of the first correction reference voltage VFC may be adjusted (see FIG. 9A). Therefore, as depicted in FIG. 9A, the intersection point (switching temperature) of the first correction reference voltage VFC and the second reference voltage VS may be controlled. For example, when the switch S1 is turned on to supply the first reference voltage VF as the first correction reference voltage VFC, the temperature at the intersection point of the first reference voltage VF and the second reference voltage VS may become a switching temperature Ts1. On the other hand, when the switch S2 is turned on to supply the divided voltage VF1 lower than the first reference voltage VF as the first correction reference voltage VFC, the temperature at the intersection point of the divided voltage VF1 and the second reference voltage VS may become a switching temperature Ts2 on the high temperature side of the switching temperature Ts1. The changing point (folding point) of the temperature gradient may arbitrarily be controlled by controlling the intersection point of the first correction reference voltage VFC and the second reference voltage VS. The switches S1 to S4 may selectively be switched by a control signal SG that is supplied from a microcomputer 55 based on the temperature characteristic of the change in resistance ΔRs of the sensor element Rs.

When the first correction reference voltage VFC is fed into the constant current circuit 12, the first reference current IM expressed by the following equation may flow through the input-side transistor TP10 of the current mirror circuits 14 and 15.

$$IM = VFC/Rb$$

The output-side transistors TP11 and TP12 of the current mirror circuits 14 and 15 may apply the first and fourth reference currents IMa and IMb to the first and fourth current sources 10a and 10b respectively. The first and fourth reference currents IMa and IMb are substantially identical to the first reference current IM flowing through the transistor TP10.

On the other hand, the second control circuit 21 may include constant current circuits 22a and 22b and a second reference voltage producing circuit 24. The second reference voltage producing circuit 24 may include a voltage dividing circuit. The voltage dividing circuit includes an operational amplifier 25 and a plurality of resistors R5 to R8 (in FIG. 8, four). The resistors R5 to R8 are coupled in series between the input terminal to which the second reference voltage VS is supplied and the output terminal of the operational amplifier 25. The first correction reference voltage VFC produced by the first reference voltage producing circuit 16 may be fed into the non-inverting input terminal of the operational amplifier 25, and the output terminal of the operational amplifier 25 may be coupled to the inverting input terminal of the operational amplifier 25. Accordingly, the potential at the output terminal of the operational amplifier 25 may be controlled so as to be substantially equal to the first correction reference voltage VFC. Therefore, the resistors R5 to R8 may act as the voltage dividing resistor that divides the potential difference between the second reference voltage VS and the first correction reference voltage VFC.

A switch S5a may be coupled to the input terminal to which the second reference voltage VS is supplied. The switch S5a directly supplies the second reference voltage VS as a second correction reference voltage VSCa. Switches S6a to S8a may be coupled to the coupling points of the resistors R5 to R8 respectively. The switches S6a to S8a selectively supply divided voltages VS1 to VS3 of the coupling points as the second correction reference voltage VSCa. The outputs of the switches S5a to S8a may be coupled to the non-inverting input terminal of an operational amplifier 23a of the constant current circuit 22a.

In the thus configured voltage dividing circuit, one of the switches S5a to S8a is turned on, and the voltage corresponding to the turned-on switch in the voltages VS and VS1 to VS3 may be supplied as the second correction reference voltage VSCa to the non-inverting input terminal of the operational amplifier 23a. The voltage dividing ratio of the voltage dividing circuit is adjusted by selectively switching the switches S5a to S8a, so that the temperature gradient of the second correction reference voltage VSCa may be adjusted (see FIG. 9B). Specifically, for example, when the first correction reference voltage VFC is the first reference voltage VF while the intersection point of the first reference voltage VF and the second reference voltage VS has the temperature of 25° C. and the voltage value of 0.7V, the first reference voltage VF and the second reference voltage VS may be expressed as follows.

$$VF = 0.7(V) + \{0(mV/^\circ C.)\} \times \{Ta - 25(^\circ C.)\} \qquad \text{[Formula 1]}$$
$$= 0.7(V)$$
$$VS = 0.7(V) + \{-4(mV/^\circ C.)\} \times \{Ta - 25(^\circ C.)\}$$

where Ta may be an ambient temperature. Assuming that r1 is a combined resistance between the turned-on switch and the input terminal to which the second reference voltage VS is supplied and r2 is a combined resistance between the turned-on switch and the output terminal of the operational amplifier 25, the second correction reference voltage VSCa may be expressed as follows. For example, when the switch S7a is turned on, the combined resistance of the resistors R5 and R6 may become r1, and the combined resistance of the resistors R7 and R8 may become r2.

$$VSCa = \frac{r2}{r1+r2} \times (VS - VF) + VF \qquad \text{[Formula 2]}$$
$$= \frac{r2}{r1+r2} \times$$
$$\left[\left\{0.7 + \left(\frac{-4(mV/^\circ C.) \times}{(Ta-25)}\right)\right\} - 0.7\right] + 0.7$$
$$= \frac{r2}{r1+r2} \times \{-4(mV/^\circ C.)\} \times (Ta-25) + 0.7$$

As is clear from the above equation, the temperature gradient of the second correction reference voltage VSCa is arbitrarily controlled by adjusting the voltage dividing ratio using the combined resistances r1 and r2. Accordingly, the second correction reference voltage VSCa having any temperature gradient may be produced by selectively switching the switches S5a to S8a. The switches S5a to S8a are selectively switched by the control signal SG that is supplied from the microcomputer 55 based on the temperature characteristic of the change in resistance ΔRs of the sensor element Rs.

When the second correction reference voltage VSCa is fed into the constant current circuit 22a, the second reference current IPa expressed by the following equation may flow through the transistor TP21 of the second current source 20a:

$$IPa = VSCa/Rb$$

On the other hand, switches S5b to S8b may be coupled to the coupling points of the resistors R5 to R8 and the input terminal to which the second reference voltage VS is supplied. The switches S5b to S8b are coupled in parallel to the switches S5a to S8a, respectively. The switches S5b to S8b are used to selectively supply the voltages VS and VS1 to VS3 as the fifth correction reference voltage VSCb, and the outputs of the switches S5a to S8a may be coupled to the non-inverting input terminal of an operational amplifier 23b of the constant current circuit 22b. In the thus configured voltage dividing circuit, one of the switches S5b to S8b is turned on, and the voltage corresponding to the turned-on switch in the voltages VS and VS1 to VS3 may be supplied as a fifth correction reference voltage VSCb to the non-inverting input terminal of the operational amplifier 23b. The voltage dividing ratio of the voltage dividing circuit is adjusted by selectively switching the switches S5b to S8b, so that the temperature gradient of the fifth correction reference voltage VSCb may be adjusted (see FIG. 9B). The switches S5b to S8b may selectively be switched by the control signal SG that is supplied from the microcomputer 55 based on the temperature characteristic of the change in resistance ΔRs of the sensor element Rs.

When the fifth correction reference voltage VSCb is fed into the constant current circuit 22b, the fifth reference current IPb expressed by the following equation may flow through the transistor TP23 of the fifth current source 20b:

$$IPb = VSCb/Rb$$

In the first differential current producing circuit 3a, the first current source 10a may draw the first reference current IMa (=VFCa/Rb) from the node N1, and the second current source 20a may discharge the second reference current IPa (=VSCa/Rb) to the node N1. The first differential current IOP (=IMa−IPa≧0) in which the second reference current IPa is subtracted from the first reference current IMa may flow through the PMOS transistor TP1 whose drain is coupled to the node N1 (see FIG. 10B).

The PMOS transistor TP1 and a PMOS transistor TP6 may make up the current mirror circuit. The drain of the output-side transistor TP6 may be coupled to the third current source 50 through the switch SW1. The output-side transistor TP6 has the electric characteristic that is substantially identical to that of the input-side transistor TP1. Accordingly, the first differential current IOP flowing through the input-side transistor TP1 may flow through the output-side transistor TP6. Particularly, when the switch SW1 is turned on, the output-side transistor TP6 may discharge the first differential current IOP to the node N2.

On the other hand, the first differential current IOP may flow through the transistors TP2, TN1, and TN2 by the current mirror operation of the current mirror circuits 30a and 40a. Particularly the output-side transistor TN2 of the current mirror circuit 40a may be coupled to the third current source 50 through the switch SW2, and the output-side transistor TN2 may draw the first differential current IOP from the node N2 when the switch SW2 is turned on.

Thus, the switches SW1 and SW2 may be used to select whether the first differential current producing circuit 3a is caused to act as the discharging circuit that discharges the first differential current IOP to the node N2 or the drawing circuit that draws the first differential current IOP from the node N2. When the first differential current IOP is discharged to the node N2, the first differential current IOP may be added to the third reference current IMS (see solid line of FIG. 11). On the other hand, when the first differential current IOP is drawn from the node N2, the first differential current IOP may be subtracted from the third reference current IMS (see alternate long and short dash line of FIG. 11). That is, the polarity of the first differential current IOP is switched by switching the switches SW1 and SW2, so that the direction of the temperature gradient of the output current IO on the high temperature side of the switching temperature may be switched. The switches SW1 and SW2 may selectively be switched by the control signal SG that is supplied from the microcomputer 55 based on the temperature characteristic of the change in resistance ΔRs of the sensor element Rs.

In the second differential current producing circuit 3b, the fourth current source 10b may draw the fourth reference current IMb (=VFCb/Rb) from the node N3, and the fifth current source 20b may discharge the fifth reference current IPb (=VSCb/Rb) to the node N3. The second differential current IOM (=IPb−IMb≧0), which is derived by subtracting the fourth reference current IMb from the fifth reference current IPb, may flow through the NMOS transistor TN3 whose drain is coupled to the node N3 (see FIG. 10B).

The second differential current IOM may flow through the transistors TN4, TP3, and TP4 by the current mirror operation of the current mirror circuits 30b and 40b. Particularly the output-side transistor TP4 of the current mirror circuit 40b may be coupled to the third current source 50 through the switch SW3, and the output-side transistor TP4 may discharge the second differential current IOM to the node N2 when the switch SW3 is turned on.

The NMOS transistor TN3 and an NMOS transistor TN6 may make up the current mirror circuit. The drain of the output-side transistor TN6 may be coupled to the third current source 50 through the switch SW4. The output-side transistor TN6 has the electric characteristic that is substantially identical to that of the input-side transistor TN3. Accordingly, the second differential current IOM flowing through the input-side transistor TN3 may flow through the output-side transistor TN6. Particularly, when the switch SW4 is turned on, the output-side transistor TN6 may draw the second differential current IOM from the node N2.

Thus, the switches SW3 and SW4 may be used to select whether the second differential current producing circuit 3b is caused to act as the discharging circuit that discharges the second differential current IOM to the node N2 or the drawing circuit that draws the second differential current IOM from the node N2. When the second differential current IOM is discharged to the node N2, the second differential current IOM may be added to the third reference current IMS (see solid line of FIG. 11). On the other hand, when the second differential current IOM is drawn from the node N2, the second differential current IOM may be subtracted from the third reference current IMS (see alternate long and short dash line of FIG. 11). That is, the polarity of the second differential current IOM is switched by switching the switches SW3 and SW4, so that the direction of the temperature gradient of the output current IO on the low temperature side of the switching temperature may be switched. The switches SW3 and SW4 may selectively be switched by the control signal SG that is supplied from the microcomputer 55 based on the temperature characteristic of the change in resistance ΔRs of the sensor element Rs.

In the thus configured current producing circuit 1c, the second and fifth reference currents IPa and IPb may respectively be produced based on the second and fifth correction reference voltages VSCa and VSCb that are separately produced by the second control circuit 21. The temperature gradient of the output current IO on the high temperature side of the switching temperature may be set based on the second reference current IPa, and the temperature gradient of the output current IO on the low temperature side of the switching temperature may be set based on the fifth reference current IPb. Accordingly, the temperature gradients of the second and fifth correction reference voltages VSCa and VSCb are independently controlled, which allows the temperature gradients of the output currents IO on the high and low temperature sides of the changing point (switching temperature) to be independently controlled. In the third embodiment, because the first and fourth reference currents IMa and IMb have the substantially identical values, the intersection point of the current values of the first and second reference currents IMa and IPa may substantially be identical to the intersection point of the current values of the fourth and fifth reference currents IMb and IPb (see FIG. 10B).

An operation of the thus configured current producing circuit 1c will be described below.

The case in which the switches S2, S7a, S6b, SW1, and SW3 are turned on as depicted in FIG. 8 by the control signal SG supplied from the microcomputer 55 based on the temperature characteristic of the change in resistance ΔRs of the sensor element Rs will be described by way of example.

Figure 10A:
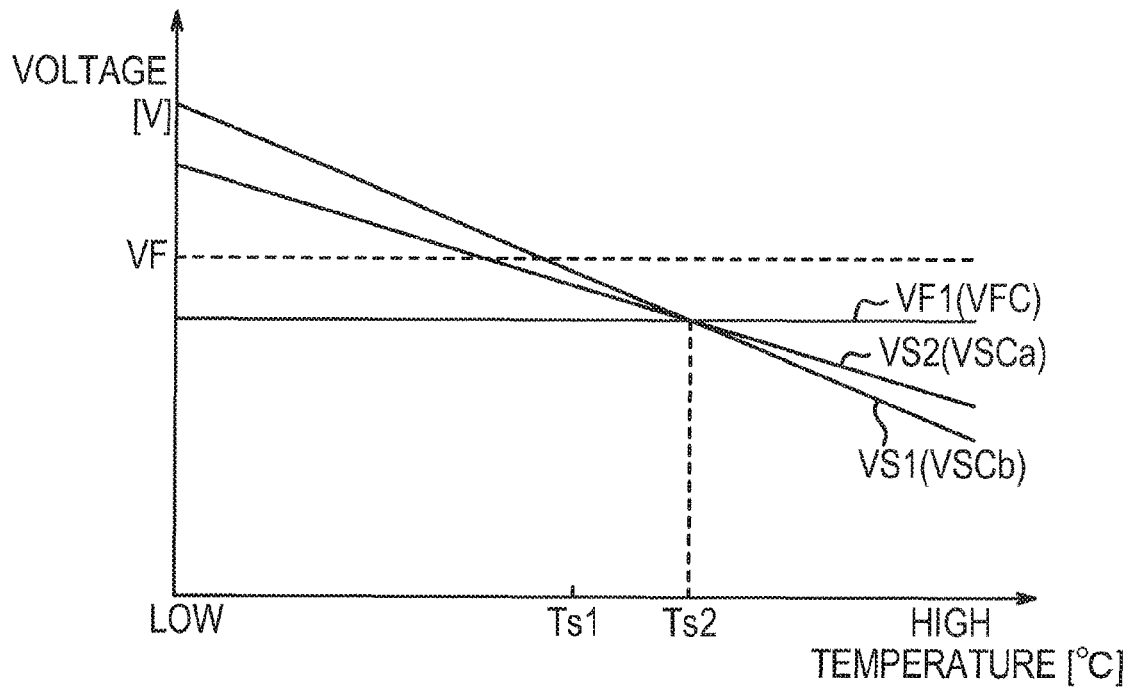
FIGS. 10A and 10B are characteristic views for depicting a reference voltage and a reference current.

When the switch S2 is turned on, the divided voltage VF1 may be supplied as the first correction reference voltage VFC (see FIG. 10A). Therefore, the temperature at the intersection point of the first correction reference voltage VFC and the second reference voltage VS may become the switching temperature Ts2. When the first correction reference voltage VFC is fed into the constant current circuit 12, the constant current circuit 12 produces the first reference current IM (=VF1/Rb) (see FIG. 10B), and the first reference current IM may flow through the transistor TP10. Therefore, the output-side transistors TP11 and TP12 of the current mirror circuits 14 and 15 may apply the first and fourth reference currents IMa and IMb substantially identical to the first reference current IM to the first and fourth current sources 10a and 10b, respectively.

On the other hand, when the switch S7a is turned on, the divided voltage VS2 may be supplied as the second correction reference voltage VSCa (see FIG. 10A). When the switch S6b is turned on, the divided voltage VS1 may be supplied as the fifth correction reference voltage VSCb (see FIG. 10A). Therefore, the second and fifth correction reference voltage VSCa and VSCb may differ from each other in the temperature gradient. Particularly the fifth correction reference voltage VSCb may have the temperature gradient steeper than that of the second correction reference voltage VSCa.

Figure 10B:
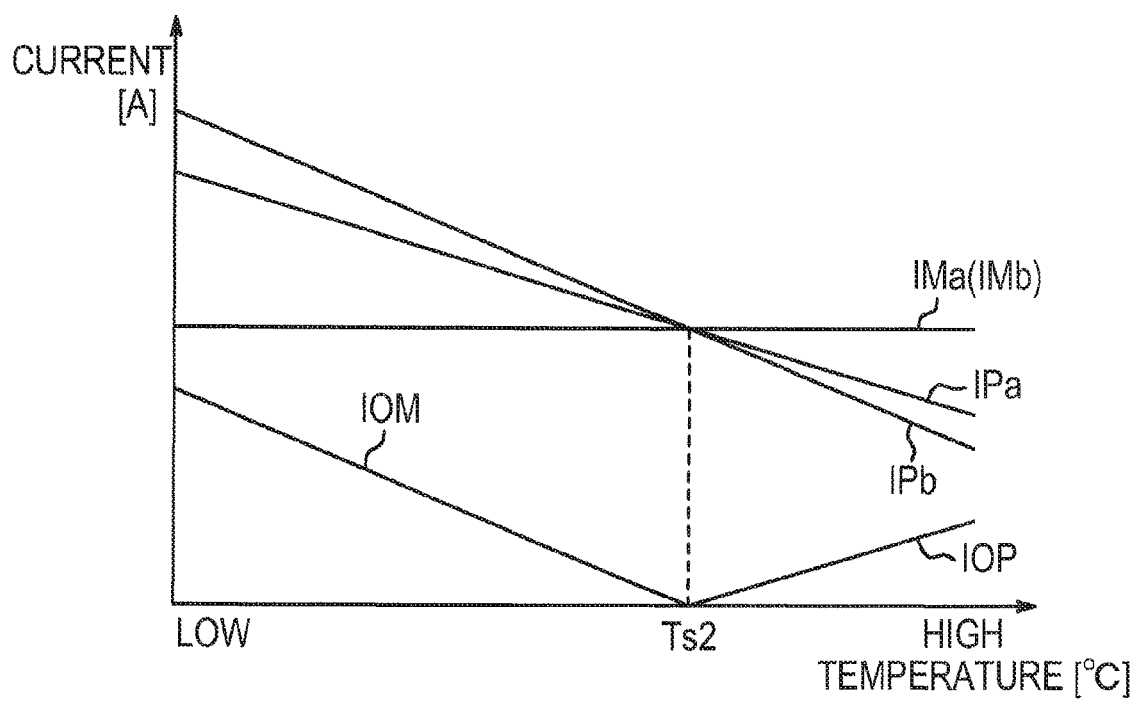

When the second correction reference voltage VSCa is fed into the constant current circuit 22a, the constant current circuit 22a produces the second reference current IPa (=VS2/Rb), and the second reference current IPa may flow through the transistor TP21 of the second current source 20a (see FIG. 10B). When the fifth correction reference voltage VSCb is fed into the constant current circuit 22b, the constant current circuit 22b produces the fifth reference current IPb (=VS1/Rb), and the fifth reference current IPb may flow through the transistor TP23 of the fifth current source 20b (see FIG. 10B). The fifth reference current IPb may have the temperature gradient steeper than that of the second reference current IPa. The intersection point of the current values of the first and second reference currents IMa and IPa is substantially identical to the intersection point of the current values of the fourth and fifth reference currents IMb and IPb, and the temperature at the intersection point may be the switching temperature Ts2.

The first differential current producing circuit 3a may produce the first differential current IOP (=IMa−IPa≧0) in which the second reference current IPa flowing from the second current source 20a is subtracted from the first reference current IMa flowing from the first current source 10a. At this point, when the switch SW1 is turned on, because the first differential current producing circuit 3a acts as the discharging circuit, the PMOS transistor TP6 may discharge the first differential current IOP to the node N2 through the switch SW1.

The second differential current producing circuit 3b may produce the second differential current IOM (=IPb−IMb≧0) in which the fourth reference current IMb flowing from the fourth current source 10b is subtracted from the fifth reference current IPb flowing from the fifth current source 20b. At this point, when the switch SW3 is turned on, because the second differential current producing circuit 3b acts as the discharging circuit, the PMOS transistor TP4 may discharge the second differential current IOM to the node N2 through the switch SW3.

Figure 11:
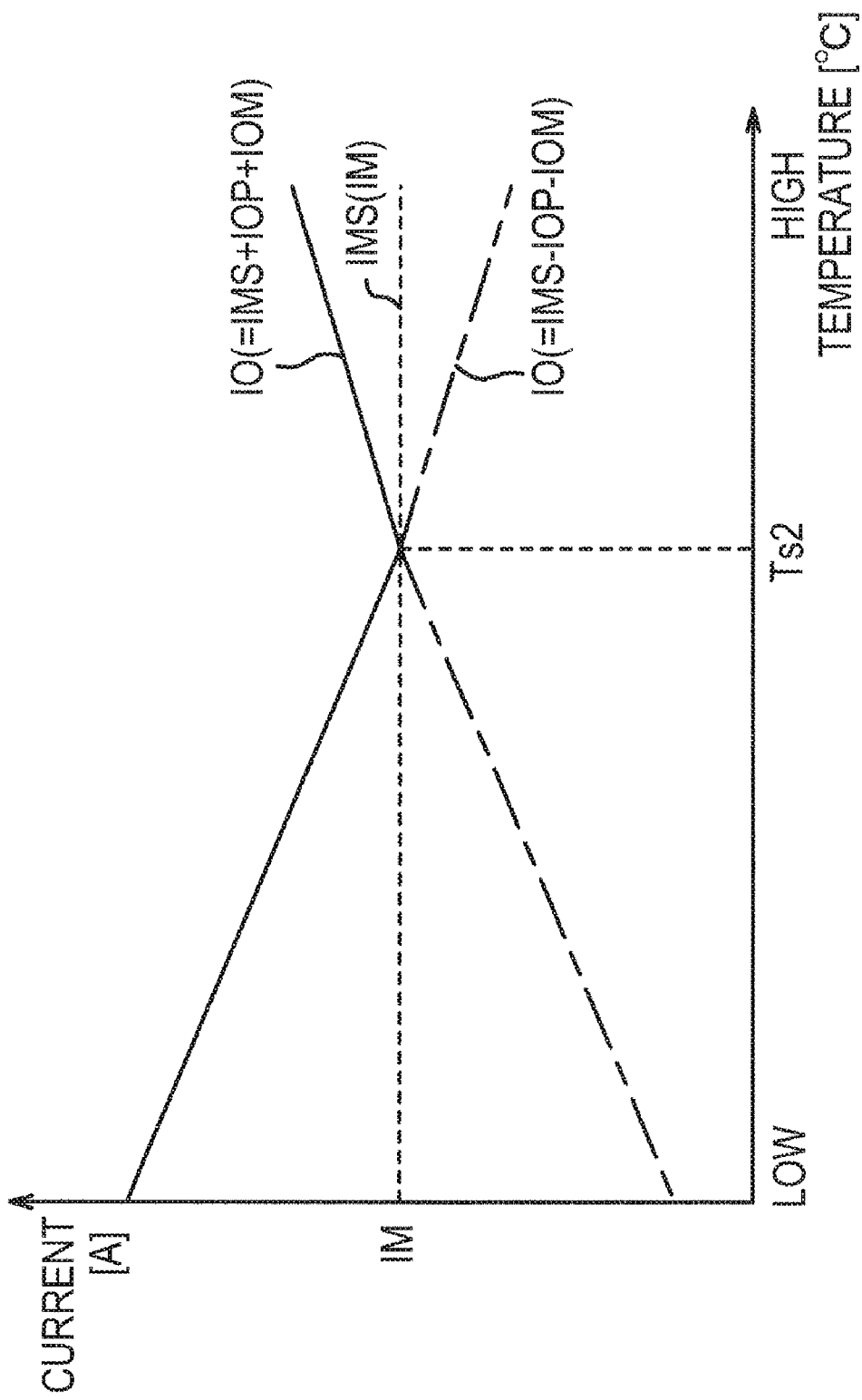
FIG. 11 is a characteristic view for depicting an output current.

The PMOS transistor TP5 operated as the third current source 50 may discharge the third reference current IMS substantially identical to the first reference current IM to the node N2. Accordingly, as depicted in FIG. 11, the first differential current IOP and the second differential current IOM may be added to the third reference current IMS to produce the V-shape output current IO (=IMS+IOP+IOM) in which the temperature gradient and the direction thereof are changed at the switching temperature Ts. That is, the output current IO may have the temperature characteristic (specifically the temperature characteristic equal to that of the fifth reference current IPb (fifth correction reference voltage VSCb)) that is substantially equal to that of the second differential current IOM on the low temperature side of the switching temperature Ts2. The output current IO may have the temperature characteristic (specifically the temperature characteristic having the gradient in the opposite direction to the gradient of the temperature characteristic of the second reference current IPa (second correction reference voltage VSCa)) that is substantially equal to that of the first differential current IOP on the high temperature side of the switching temperature Ts2. Thus, in the current producing circuit 1c of the third embodiment, the temperature gradients of the output currents IO on the high and low temperature sides of the changing point (switching temperature Ts2) may independently be controlled by independently controlling the temperature gradients of the second reference current IPa (second correction reference voltage VSCa) and fifth reference current IPb (fifth correction reference voltage VSCb).

Figure 12:
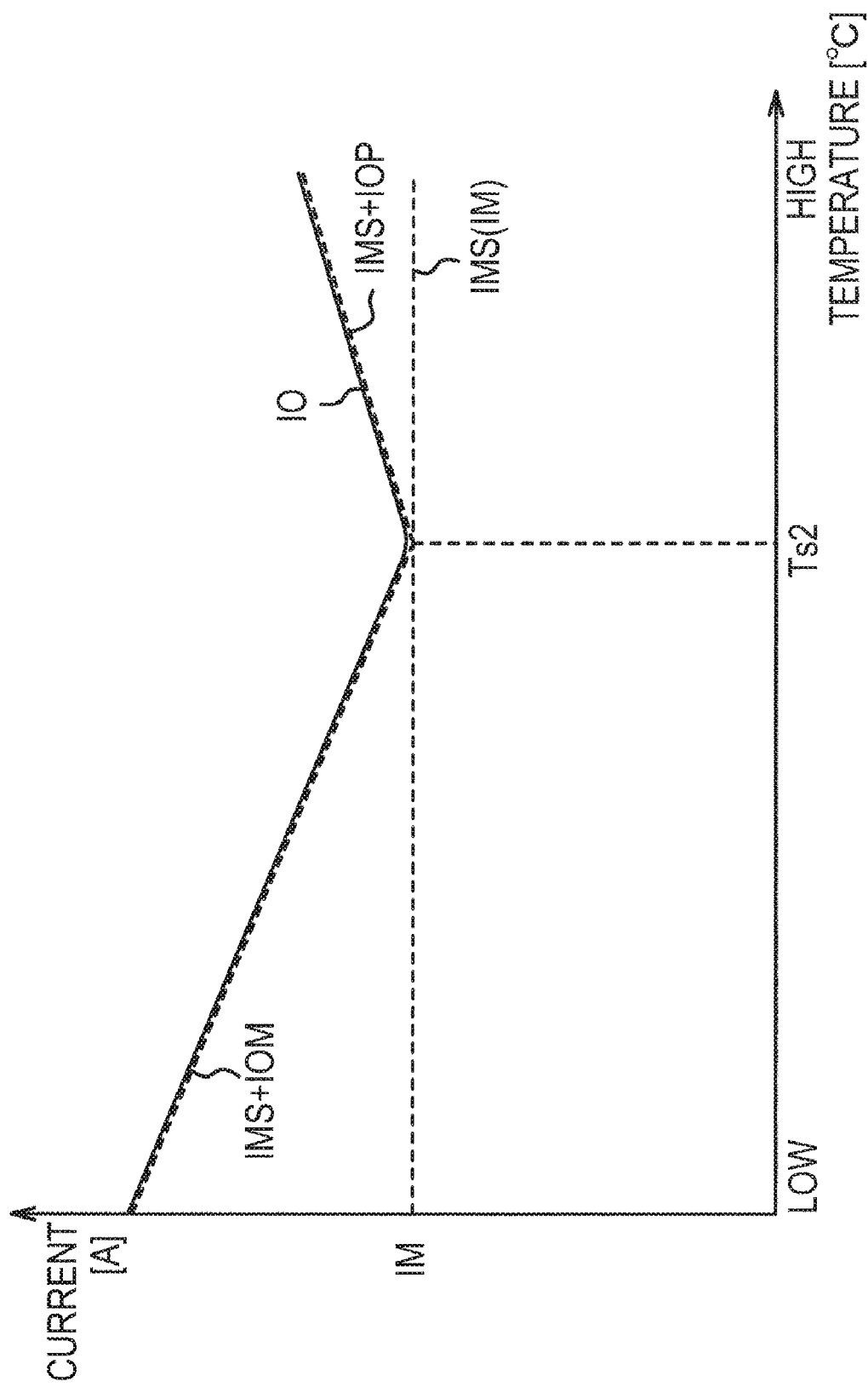
FIG. 12 is a view for explaining simulation result.

FIG. 12 depicts results of simulation of the output current IO produced in turning on the switches S2, S7a, S6b, SW1, and SW3 as described above.

As is clear from the result of FIG. 12, the output current IO (see solid line of FIG. 12) produced by the current producing circuit 1c of the third embodiment may switch the temperature gradient at a desired temperature (switching temperature Ts2) and a desired current value (specifically the temperature gradient of the second differential current IOM is switched to the temperature gradient of the first differential current IOP). In the neighborhood of the switching temperature Ts2, the temperature gradient may smoothly be switched without generating a discontinuous step. Accordingly, the correction accuracy of the output current IO may be improved with respect to the temperature characteristic of the change in resistance ΔRs of the sensor element Rs.

The current producing circuit 1c includes the first reference voltage producing circuit 16 that produces the divided voltage in which the first reference voltage VF is divided at a specific voltage dividing ratio as the first correction reference voltage VFC. The specific voltage dividing ratio may be varied by selectively switching the switches S1 to S4. When the voltage dividing ratio is adjusted, the voltage value of the first correction reference voltage VFC may be adjusted. Therefore, the intersection point (switching temperature) of the first correction reference voltage VFC and the second reference voltage VS may be controlled, and the changing point (folding point) of the temperature gradient of the output current IO may arbitrarily be controlled. Accordingly, a degree of freedom may be enhanced in the temperature characteristic of the output current IO. Further, the switches S1 to S4 are selectively switched based on the temperature characteristic of the change in resistance ΔRs of the correction target sensor element Rs, so that the output current IO may be produced according to the temperature characteristic of the change in resistance ΔRs. Accordingly, the correction accuracy may be improved with respect to the temperature characteristic of the change in resistance ΔRs of the correction target.

The current producing circuit is includes the second reference voltage producing circuit 24 that produces the divided voltage as the second correction reference voltage VSCa or fifth correction reference voltage VSCb. The divided voltage is obtained by dividing the potential difference between the second reference voltage VS and the first correction reference voltage VFC at a specific voltage dividing ratio. The specific voltage dividing ratio may be varied by selectively switching the switches S5a to S8a and S5b to S8b, respectively. The temperature gradients of the second and fifth correction reference voltages VSCa and VSCb may be controlled by adjusting the voltage dividing ratio, and the temperature gradient of the output current IO may arbitrarily be controlled. At this point, the temperature gradients of the second and fifth correction reference voltages VSCa and VSCb may independently be controlled by selectively switching the switches S5a to S8a and the switches S5b to S8b. Thus, the temperature gradients of the output currents IO on the high and low temperature sides of the changing point (switching temperature) may independently be controlled by independently controlling the temperature gradients of the second and fifth correction reference voltages VSCa and VSCb. Accordingly, the degree of freedom may be enhanced in the temperature characteristic of the output current IO. The switches S5a to S8a and S5b to S8b are selectively switched based on the temperature characteristic of the change in resistance ΔRs of the correction target sensor element Rs, so that the output current IO may be produced according to the temperature characteristic of the change in resistance ΔRs. Accordingly, the correction accuracy may be improved with respect to the temperature characteristic of the change in resistance ΔRs of the correction target.

The current producing circuit is includes the switches SW1 and SW2 that select whether the first differential current IOP is added to or subtracted from the third reference current IMS and the switches SW3 and SW4 that select whether the second differential current IOM is added to or subtracted from the third reference current IMS. The direction of the temperature gradient of the output current IO may freely be switched by selectively switching the switches SW1 to SW4. Accordingly, the degree of freedom may be enhanced in the temperature characteristic of the output current IO.

Fourth Embodiment

A fourth embodiment will be described with reference to FIGS. 13 to 16. In the fourth embodiment, the component substantially identical to that of FIGS. 1 to 12 is designated by the same reference numeral, and the detailed description thereof will not be repeated here.

A current producing circuit 1d of the fourth embodiment produces the output current IO having the temperature characteristic. The temperature characteristic has a plurality of (in the fourth embodiment, two) changing points of the temperature gradient. Particularly, in the current producing circuits 1b and is of the second and third embodiments, the first and fourth reference currents IMa and IMb having the temperature characteristic independent of the temperature are produced based on the common first reference voltage VF (first correction reference voltage VFC), and the first and fourth reference currents IMa and IMb may be set to the substantially identical current value. Accordingly, the temperature at the intersection point of the first reference current IMa and the second reference current IPa may be matched with the temperature at the intersection point of the fourth reference current IMb and the fifth reference current IPb. Therefore, the output currents IO of the current producing circuits 1b and 1c may have one changing point of the temperature gradient.

On the other hand, in the current producing circuit 1d of the fourth embodiment, first and fourth reference currents IMa and IMb having the temperature characteristic independent of the temperature may be produced so as to have different current values. Accordingly, the temperature at the intersection point of the first reference current IMa and the second reference current IPa may differ from the temperature at the intersection point of the fourth reference current IMb and the fifth reference current IPb. When the first and second differential current IOP and IOM produced from the reference currents IMa, IMb, IPa, and IPb are added to or subtracted from the third reference current IMS, the output current IO having the temperature characteristic having the two changing points of the temperature gradient may be produced.

Specifically, the first reference voltage producing circuit 16 may separately produce the first correction reference voltage VFCa used to produce the first reference current IMa and the fourth correction reference voltage VFCb used to produce the fourth reference current IMb. The first reference voltage producing circuit 16 may include a voltage dividing circuit. The voltage dividing circuit includes a plurality of (in FIG. 13, four) resistors R1 to R4, switches S1$a$ to S4$a$, and switches S1$b$ to S4$b$ that are coupled in series between the ground and the input terminal to which the first reference voltage VF is supplied.

The switch S1$a$ may be coupled to the input terminal to which the first reference voltage VF is supplied. The switch S1$a$ directly supplies the first reference voltage VF as the first correction reference voltage VFC. The switches S2$a$ to S4$a$ may be coupled to the coupling points of the resistors R1 to R4, respectively. The switches S2$a$ to S4$a$ selectively supply the divided voltages VF1 to VF3 of the coupling points as the first correction reference voltage VFCa. The outputs of the switches S1$a$ to S4$a$ may be coupled to the non-inverting input terminal of the operational amplifier 13$a$ of the constant current circuit 12$a$.

On the other hand, the switches S1$b$ to S4$b$ may be coupled to the input terminal to which the first reference voltage VF is supplied and the coupling points of the resistors R1 to R4. The switches S1$b$ to S4$b$ are coupled in parallel to the switches S1$a$ to S4$a$, respectively. The switches S1$b$ to S4$b$ selectively supply the voltages VF and VF1 to VF3 as the fourth correction reference voltage VFCb, and the outputs of the switches S1$b$ to S4$b$ may be coupled to the non-inverting input terminal of the operational amplifier 13$b$ of the constant current circuit 12$b$.

In the thus configured first reference voltage producing circuit 16, one of the switches S1$a$ to S4$a$ is turned on, and the voltage corresponding to the turned-on switch in the voltages VF and VF1 to VF3 may be supplied as the first correction reference voltage VFCa to the non-inverting input terminal of the operational amplifier 13$a$. In the first reference voltage producing circuit 16, one of the switches S1$b$ to S4$b$ is turned on, and the voltage corresponding to the turned-on switch in the voltages VF and VF1 to VF3 may be supplied as the fourth correction reference voltage VFCb to the non-inverting input terminal of the operational amplifier 13$b$. The voltage values of the first and fourth correction reference voltages VFCa and VFCb are adjusted by selectively switching the switches S1$a$ to S4$a$ and S1$b$ to S4$b$, and the intersection point (switching temperature) of the first and fourth correction reference voltages VFCa and VFCb and the second reference voltage VS may be controlled. Therefore, the changing point (folding point) of the temperature gradient may arbitrarily be controlled. The switches S1$a$ to S4$a$ and S1$b$ to S4$b$ may selectively be switched by the control signal from the microcomputer 55 (not depicted in FIG. 13) based on the temperature characteristic of the change in resistance ΔRs of the sensor element Rs.

Figure 13:
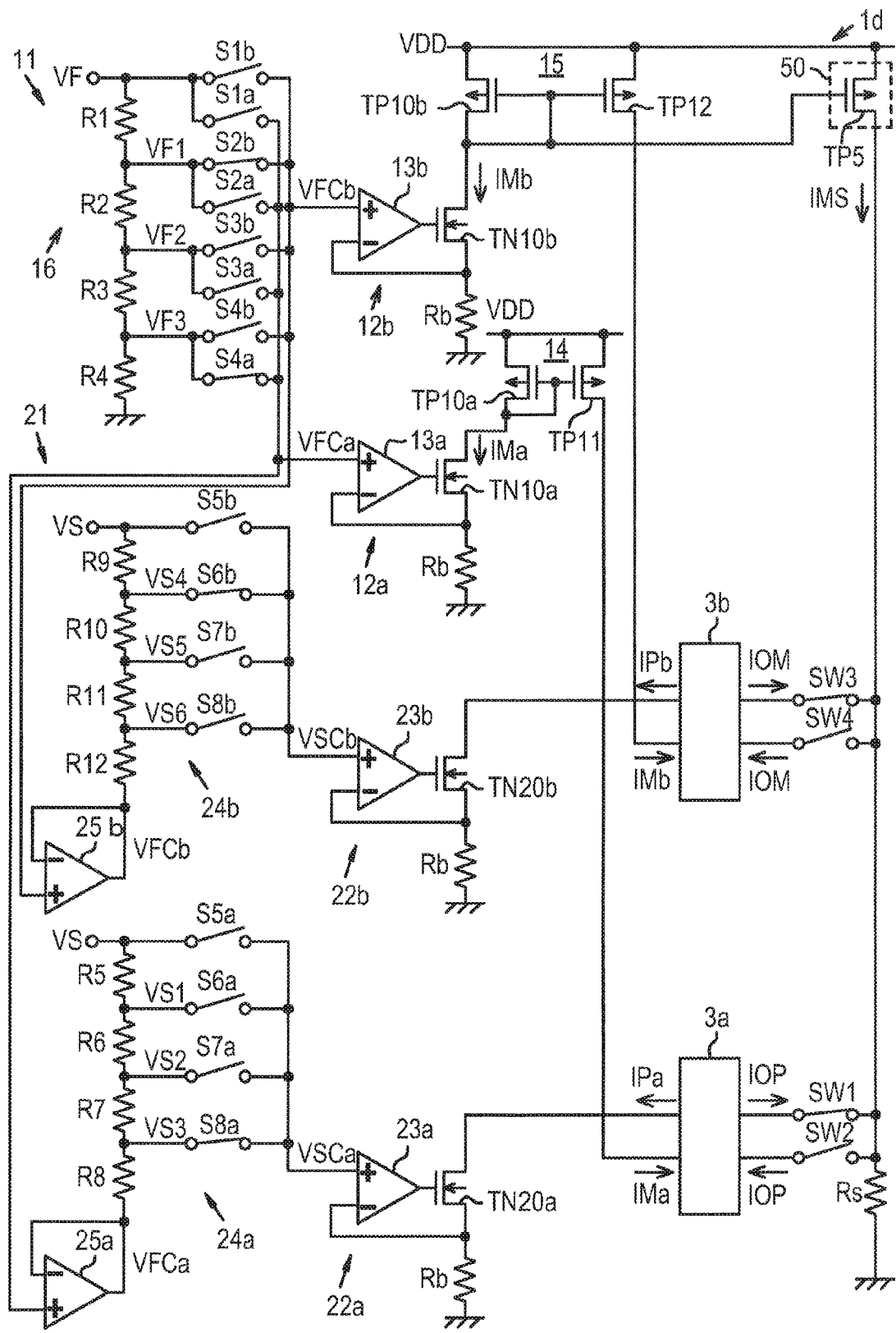
FIG. 13 is a circuit diagram depicting a current producing circuit according to a fourth embodiment.

In the circuit example of FIG. 13, the switch S4$a$ and the switch S2$b$ may be turned on such that the voltage values of the first and fourth correction reference voltages VFCa and VFCb differ from each other. When the switch S4$a$ is turned on, the divided voltage VF3 is supplied as the first correction reference voltage VFCa (see FIG. 14A), and the temperature at the intersection point of the first correction reference voltage VFCa and the second reference voltage VS (second correction reference voltage VSCa) may become a switching temperature Ts3. When the switch S2$b$ is turned on, the divided voltage VF1 is supplied as the fourth correction reference voltage VFCb (see FIG. 14A), and the temperature at the intersection point of the fourth correction reference voltage VFCb and the second reference voltage VS (fifth correction reference voltage VSCb) may become the switching temperature Ts2.

Figure 14A:
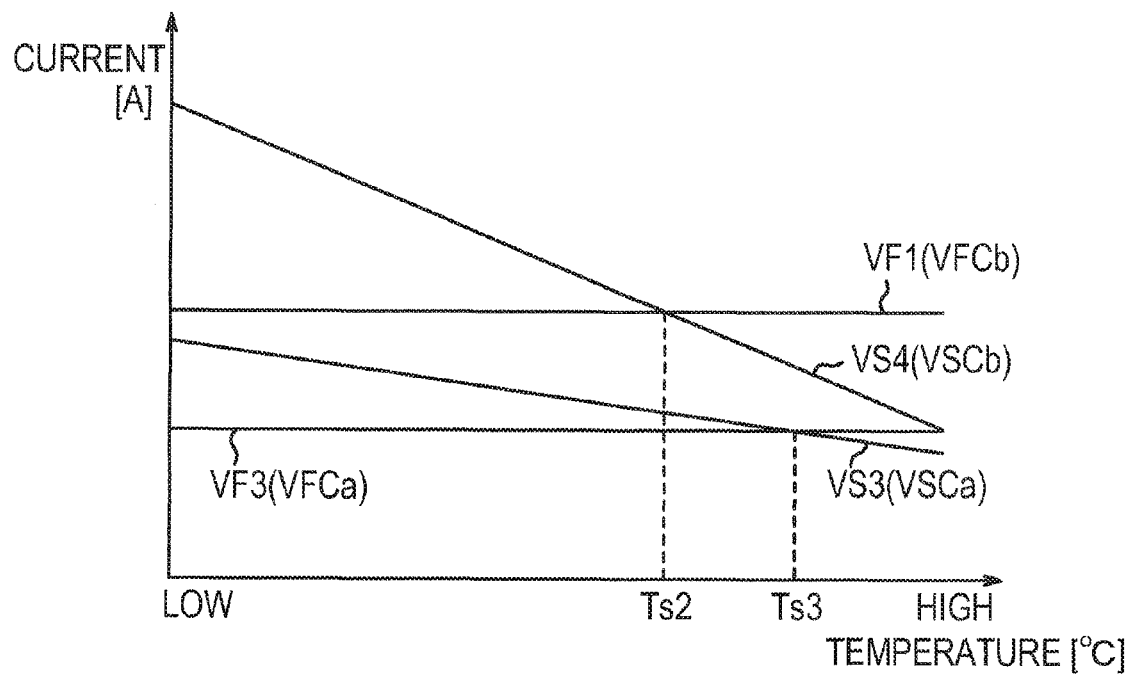
FIGS. 14A and 14B are characteristic views for explaining a differential current.
Figure 14B:
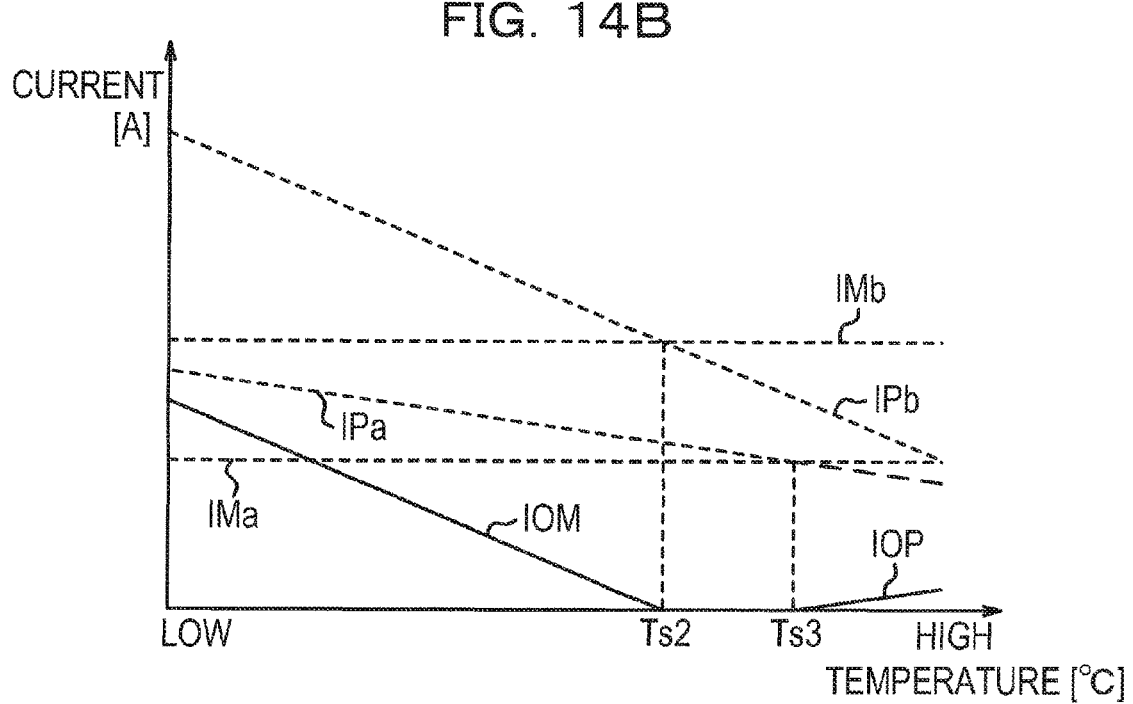

The constant current circuit 12$a$ may produce the first reference current IMa (=VF3/Rb) based on the first correction reference voltage VFCa, and the constant current circuit 12$b$ may produce the fourth reference current IMb based on the fourth correction reference voltage VFCb (see dashed lines of FIG. 14B). Therefore, the current mirror circuits 14 and 15 may supply the first reference current IMa to the first differential current producing circuit 3$a$ and supply the fourth reference current IMb to the second differential current producing circuit 3$b$.

On the other hand, the second reference voltage producing circuit 24 may include a voltage dividing circuit 24$a$ and a voltage dividing circuit 24$b$. The voltage dividing circuit 24$a$ produces the second correction reference voltage VSCa used to produce the second reference current IPa. The voltage dividing circuit 24$b$ produces the fifth correction reference voltage VSCb used to produce the fifth reference current IPb.

The voltage dividing circuit 24$a$ may include the resistors R5 to R8 and the switches S5$a$ to S8$a$. The resistors R5 to R8 divide the potential difference between the second reference voltage VS and the first correction reference voltage VFCa. The switches S5$a$ to S8$a$ are coupled to the input terminal to which the second reference voltage VS is supplied and the coupling points of the resistors R5 to R8. In the thus configured voltage dividing circuit 24$a$, one of the switches S5$a$ to S8$a$ is turned on, and the voltage corresponding to the turned-on switch in the voltages VS and VS1 to VS3 may be supplied as the second correction reference voltage VSCa to the constant current circuit 22$a$. In the circuit example of FIG. 13, the switch S8$a$ is turned on, and the divided voltage VS3 may be supplied as the second correction reference voltage VSCa to the constant current circuit 22$a$ (see FIG. 14A). Therefore, the constant current circuit 22$a$ produces the second reference current IPa (=VS3/Rb) based on the second correction reference voltage VSCa, and the second reference current IPa may be supplied to the first differential current producing circuit 3$a$ (see dashed lines of FIG. 14B).

The voltage dividing circuit 24$b$ may include resistors R9 to R12 and the switches S5$b$ to S8$b$. The resistors R9 to R12 divide the potential difference between the second reference voltage VS and the fourth correction reference voltage VFCb. The switches S5$b$ to S8$b$ are coupled to the input terminal to which the second reference voltage VS is supplied and the coupling points of the resistors R9 to R12. In the thus configured voltage dividing circuit 24$b$, one of the switches S5$b$ to S8$b$ is turned on, and the voltage corresponding to the turned-on switch in the voltages VS and VS4 to VS6 may be supplied as the fifth correction reference voltage VSCb to the constant current circuit 22$b$. In the circuit example of FIG. 13, the switch S6$b$ is turned on, and the divided voltage VS4 may be supplied as the fifth correction reference voltage VSCb to the constant current circuit 22b (see FIG. 14A). Therefore, the constant current circuit 22b produces the fifth reference current IPb (=VS4/Rb) based on the fifth correction reference voltage VSCb, and the fifth reference current IPb may be supplied to the second differential current producing circuit 3b (see dashed lines of FIG. 14B).

As depicted in FIG. 14B, the current values of the thus produced first and second reference currents IMa and IPa intersect each other at the switching temperature Ts3, and the magnitude relationship of the current values of the first and second reference currents IMa and IPa may be inverted at the switching temperature Ts3. That is, the second reference current IPa may be larger than the first reference current IMa on the low temperature side of the switching temperature Ts3, and the first reference current IMa may be larger than the second reference current IPa on the high temperature side of the switching temperature Ts3.

In the first differential current producing circuit 3a to which the first and second reference currents IMa and IPa are supplied, the first differential current IOP (=IMa−IPa≧0) in which the second reference current IPa is subtracted from the first reference current IMa may be produced in the period on the high temperature side of the switching temperature Ts3. The first differential current IOP may become zero on the low temperature side of the switching temperature Ts3.

As depicted in FIG. 14B, the current values of the fourth and fifth reference currents IMb and IPb intersect each other at the switching temperature Ts2, and the magnitude relationship of the current values of the fourth and fifth reference currents IMab and IPb may be inverted at the switching temperature Ts2. That is, the fifth reference current IPb may be larger than the fourth reference current IMb on the low temperature side of the switching temperature Ts2, and the fourth reference current IMb may be larger than the fifth reference current IPb on the high temperature side of the switching temperature Ts2.

In the second differential current producing circuit 3b to which the fourth and fifth reference currents IMb and IPb are supplied, the second differential current IOM (=IPb−IMb≧0) in which the fourth reference current IMb is subtracted from the fifth reference current IPb may be produced in the period on the low temperature side of the switching temperature Ts2. The second differential current IOM may become zero on the high temperature side of the switching temperature Ts2. Therefore, the current values of both the first and second differential currents IOP and IOM may become zero in the period of the switching temperature Ts2 to the switching temperature Ts3.

At this point, the PMOS transistor TP5 operated as the third current source 50 may discharge the third reference current IMS substantially identical to the fourth reference current IMb to the node N2. For example, when the switches SW1 and SW3 coupled to the first and second differential current producing circuits 3a and 3b are turned on, the output current IO in which the first and second differential currents IOP and IOM are added to the third reference current IMS may be produced as depicted by the solid line of FIG. 15. That is, the output current IO may have the temperature characteristic (specifically the temperature characteristic equal to that of the fifth reference current IPb) of the second differential current IOM on the low temperature side of the switching temperature Ts2. The output current IO may have the temperature characteristic of the third reference current IMS in the range of the switching temperature Ts2 to the switching temperature Ts3. The output current IO may have the temperature characteristic (specifically the temperature characteristic having the gradient in the opposite direction to the temperature gradient of the second reference current IPa) of the first differential current IOP on the high temperature side of the switching temperature Ts3. Thus, the output current IO produced by the current producing circuit 1d may have the two changing points of the temperature gradient, that is, the switching temperatures Ts2 and Ts3 and three kinds of temperature gradients.

When the switches SW2 and SW4 are turned on, the output current IO (=IMS−IOP−IOM) in which the first and second differential currents IOP and IOM are subtracted from the third reference current IMS may be produced as depicted by the alternate long and short dash line of FIG. 15.

Figure 16:
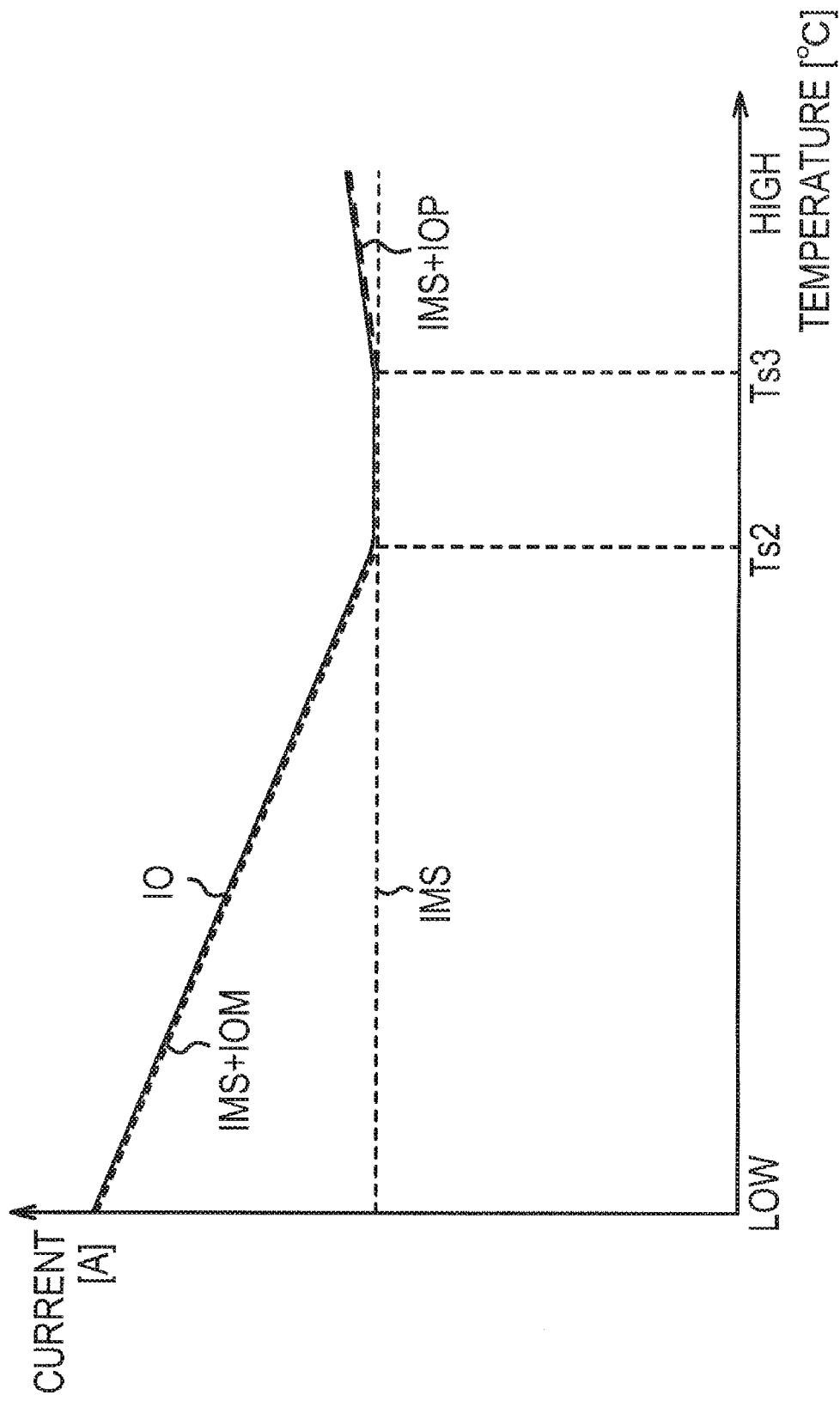
FIG. 16 is a view for explaining a simulation result.

As with the circuit example of FIG. 13, FIG. 16 depicts the simulation result of the output current IO produced in turning on the switches S4a, S2b, S8a, S6b, SW1, and SW3.

As is clear from the result of FIG. 16, the output current IO (see solid line of FIG. 16) produced by the current producing circuit 1d of the fourth embodiment may switch the temperature gradient at the desired switching temperature Ts2 and the desired current value (specifically the temperature gradient of the second differential current IOM is switched to the temperature gradient of the third reference current IMS). The output current IO switches the temperature gradient at the desired switching temperature Ts3 and the desired current value (specifically the temperature gradient of the third reference current IMS is switched to the temperature gradient of the first differential current IOP). Near the switching temperatures Ts2 and Ts3, the temperature gradient may smoothly be switched without generating a discontinuous step. Accordingly, the correction accuracy of the output current IO may be improved with respect to the temperature characteristic of the change in resistance ΔRs of the sensor element Rs.

The first and fourth reference currents IMa and IMb are produced such that the current values of the first and fourth reference currents IMa and IMb differ from each other. Therefore, the temperature at the intersection point of the first reference current IMa and the second reference current IPa differs from the temperature at the intersection point of the fourth reference current IMb and the fifth reference current IPb, so that the two changing points may be provided in the temperature gradient of the output current IO. Accordingly, the degree of freedom may be enhanced in the temperature characteristic of the output current IO, and the output current IO having a complicated temperature characteristic may be produced.

Fifth Embodiment

A fifth embodiment will be described with reference to FIGS. 17 and 18. In the fifth embodiment, components substantially identical to those of FIGS. 1 to 16 are designated by the same reference numerals, and the detailed description thereof will not be repeated here.

In the third and fourth embodiments, the temperature gradients of the second and fifth reference currents IPa and IPb are adjusted by adjusting the temperature gradients of the reference voltages used to produce the second and fifth reference currents IPa and IPb, thereby controlling the temperature gradients of the first and second differential currents IOP and IOM. On the other hand, in a current producing circuit 1e of the fifth embodiment, the temperature gradients of the reference currents are adjusted by adjusting the current mirror ratio of the current mirror circuit acting as each current source, and the temperature gradients of the first and second differential currents IOP and IOM may be controlled.

Figure 17:
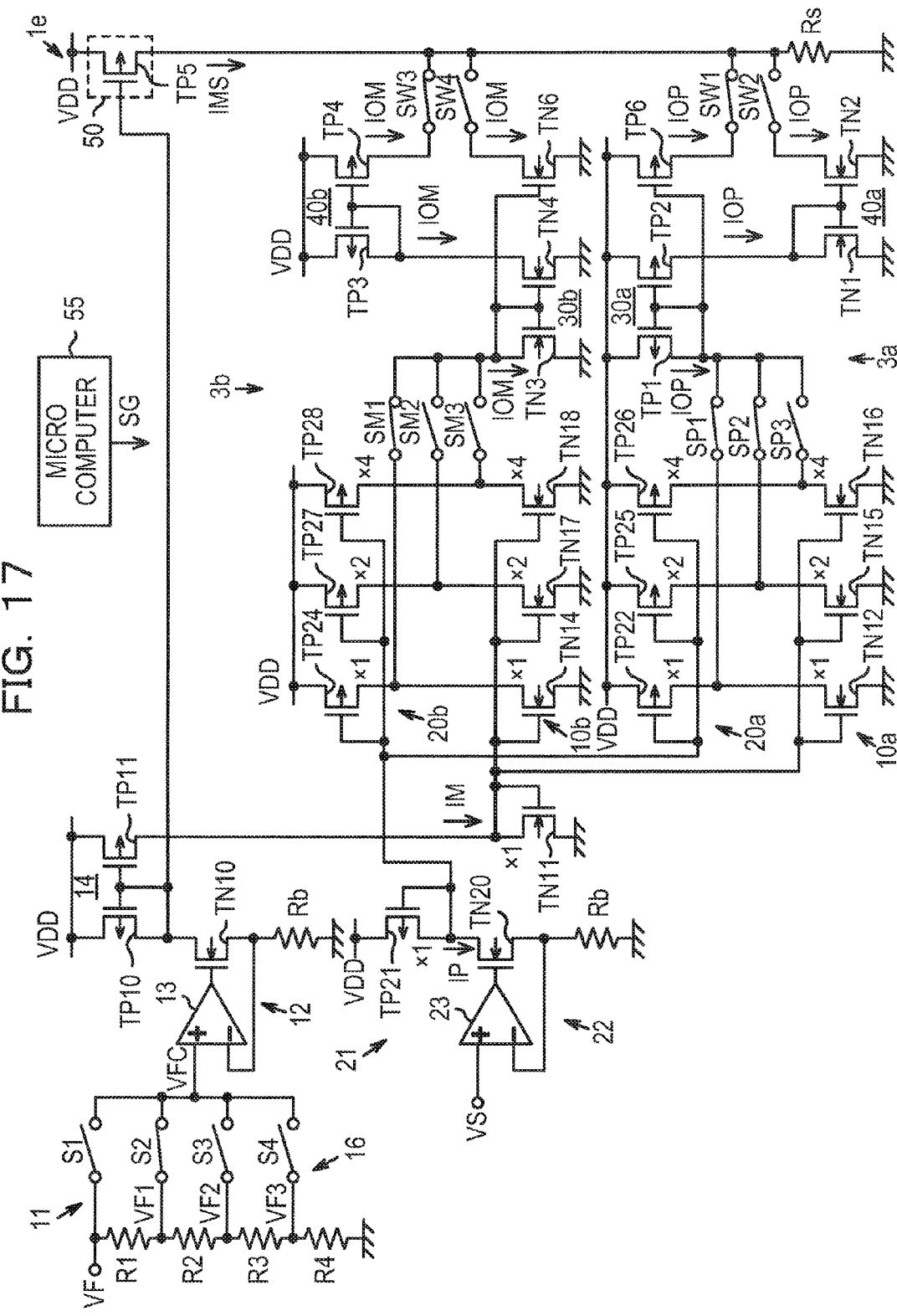
FIG. 17 is a circuit diagram depicting a current producing circuit according to a fifth embodiment.

Specifically, as depicted in FIG. 17, an output-side transistor TP11 of the current mirror circuit 14 may supply the first reference current IM (in the example of FIG. 17, IM=VF1/Rb) produced by the first control circuit 11 to the first and fourth current sources 10a and 10b.

The first current source 10a is a current mirror circuit that includes four NMOS transistors TN11, TN12, TN15, and TN16 coupled in the current mirror manner. The sources of the transistors TN11, TN12, TN15, and TN16 may be coupled to the ground. The gate of the input-side transistor TN11 may be coupled to the drain of the input-side transistor TN11 and the gates of the output-side transistors TN12, TN15, and TN16. The drains of the output-side transistors TN12, TN15, and TN16 may be coupled to the drain of the input-side transistor TP1 of the current mirror circuit 30a through the switches SP1 to SP3, respectively.

Similarly the fourth current source 10b is a current mirror circuit that includes four NMOS transistors TN11, TN14, TN17, and TN18 coupled in the current mirror manner. The drains of the output-side transistors TN14, TN17, and TN18 may be coupled to the drain of the input-side transistor TN3 of the current mirror circuit 30b through the switches SM1 to SM3, respectively.

The output-side transistors TN12 and TN14 have the electric characteristic substantially identical to that of the input-side transistor TN11, so that the output-side transistors TN12 and TN14 may apply the drain current substantially identical to the first reference current IM flowing through the input-side transistor TN11. Each of the output-side transistors TN15 and TN17 has the electric characteristic double the electric characteristic of the input-side transistor TN11, so that each of the output-side transistors TN15 and TN17 may apply the drain current double the first reference current IM. Each of the output-side transistors TN16 and TN18 has the electric characteristic four times the electric characteristic of the input-side transistor TN11, so that each of the output-side transistors TN16 and TN18 may apply the drain current four times the first reference current IM.

On the other hand, the second reference current IP (=VS/Rb) produced by the second control circuit 21 may be supplied to the second and fifth current sources 20a and 20b.

The second current source 20a is a current mirror circuit that includes four PMOS transistors TP21, TP22, TP25, and TP26 coupled in the current mirror manner. The sources of the transistors TP21, TP22, TP25, and TP26 may be coupled to the high-potential power supply VDD. The gate of the input-side transistor TP21 may be coupled to the drain of the input-side transistor TP21 and the gates of the output-side transistors TP22, TP25, and TP26. The drains of the output-side transistors TP22, TP25, and TP26 may be coupled to the drain of the input-side transistor TP1 of the current mirror circuit 30a through the switches SP1 to SP3, respectively.

Similarly the fifth current source 20b is a current mirror circuit that includes four PMOS transistors TP21, TP24, TP27, and TP28 coupled in the current mirror manner. The drains of the output-side transistors TP24, TP27, and TP28 may be coupled to the drain of the input-side transistor TN3 of the current mirror circuit 30b through the switches SM1 to SM3, respectively.

The output-side transistors TP22 and TP24 have the electric characteristic substantially identical to that of the input-side transistor TP21, so that the output-side transistors TP22 and TP24 may apply the drain current substantially identical to the second reference current IP flowing through the input-side transistor TP21. Each of the output-side transistors TP25 and TP27 has the electric characteristic double the electric characteristic of the input-side transistor TP21, so that each of the output-side transistors TP25 and TP27 may apply the drain current double the second reference current IP. Each of the output-side transistors TP26 and TP28 has the electric characteristic four times the electric characteristic of the input-side transistor TP21, so that each of the output-side transistors TP26 and TP28 may apply the drain current four times the second reference current IP.

The current mirror ratio of the current sources 10a and 20a may be set to 1:1 when only the switch SP1 is turned on in the switches SP1 to SP3 of the first differential current producing circuit 3a. That is, the current (=IM−IPA) in which the drain current (IP) of the transistor TP22 is subtracted from the drain current (IM) of the transistor TN12 may become the first differential current IOP.

As depicted in FIG. 17, when the switches SP1 and SP2 are turned on, the current mirror ratio of the current sources 10a and 20a may be set to 1:3. That is, the current in which the current (=IM−IP≧0) is added to the current (=IM×2−IP×2≧0), in which the drain current (IP×2) of the transistor TP22 is subtracted from the drain current (IM×2) of the transistor TN12, may become the first differential current IOP. At this point, the first differential current IOP may be expressed as follows.

$$IOP = (IM - IP) + (IM \times 2 - IP \times 2) \quad \text{(equation 1)}$$
$$= (IM \times 3) - (IP \times 3) \geq 0$$

The current mirror ratio of the current sources 10a and 20a may be adjusted by changing the combination of the turned-on switches in the switches SP1 to SP3. A mirror coefficient ("3" in the equation 1) by which the first and second reference currents IM and IP are multiplied may be adjusted by adjusting the current mirror ratio.

For example, when the intersection point of the first correction reference voltage VFC (divided voltage VF1) and the second reference voltage VS has the temperature of 50° C. and the voltage value of 0.6V, assuming that A is a temperature gradient coefficient of the second reference voltage VS, the first correction reference voltage VFC and the second reference voltage VS may be expressed as follows.

$$VFC = 0.6(V)$$

$$VS = 0.6(V) + A \times \{Ta - 50(° \text{ C.})\} \quad \text{[Formula 3]}$$

Therefore, the first and second reference currents IM and IP produced based on the first correction reference voltage VFC and the second reference voltage VS may be obtained as follows.

$$IM = \frac{0.6(V)}{Rb} \quad \text{[Formula 4]}$$

$$IP = \frac{0.6(V) + A \times \{Ta - 50(° \text{ C.})\}}{Rb}$$

When the first and second reference currents IM and IP are substituted for the equation 1, the first differential current IOP may be obtained as follows.

$$IOP = \left(\frac{0.6(V) \times 3}{Rb}\right) - \quad \text{[Formula 5]}$$

-continued $$= 3 \times \frac{-[A \times \{Ta - 50(^\circ \text{ C.})\}]}{Rb} \left( \frac{[0.6(V) + A \times \{Ta - 50(^\circ \text{ C.})\}] \times 3}{Rb} \right) \geq 0$$

As is clear from Formula 5, the temperature gradient coefficient A determining the temperature gradient of the first differential current IOP may be arbitrarily controlled by adjusting the mirror coefficient ("3" in the equation) of the current source 10a and 20a. That is, the first differential current IOP having any temperature gradient may be produced by adjusting the current mirror ratio of the current sources 10a and 20a.

Similarly the current mirror ratio of the current sources 10b and 20b may be adjusted by changing the combination of the turned-on switches in the switches SM1 to SM3, thereby adjusting the mirror coefficient by which the fourth and fifth reference currents IM and IP are multiplied. Therefore, the temperature gradient of the second differential current IOM is arbitrarily controlled so that the second differential current IOM having any temperature gradient may be produced. The switches SP1 to SP3 and the switches SM1 to SM3 may selectively be switched by the control signal SG supplied from the microcomputer 55 based on the temperature characteristic of the change in resistance ΔRs of the sensor element Rs.

Figure 18:
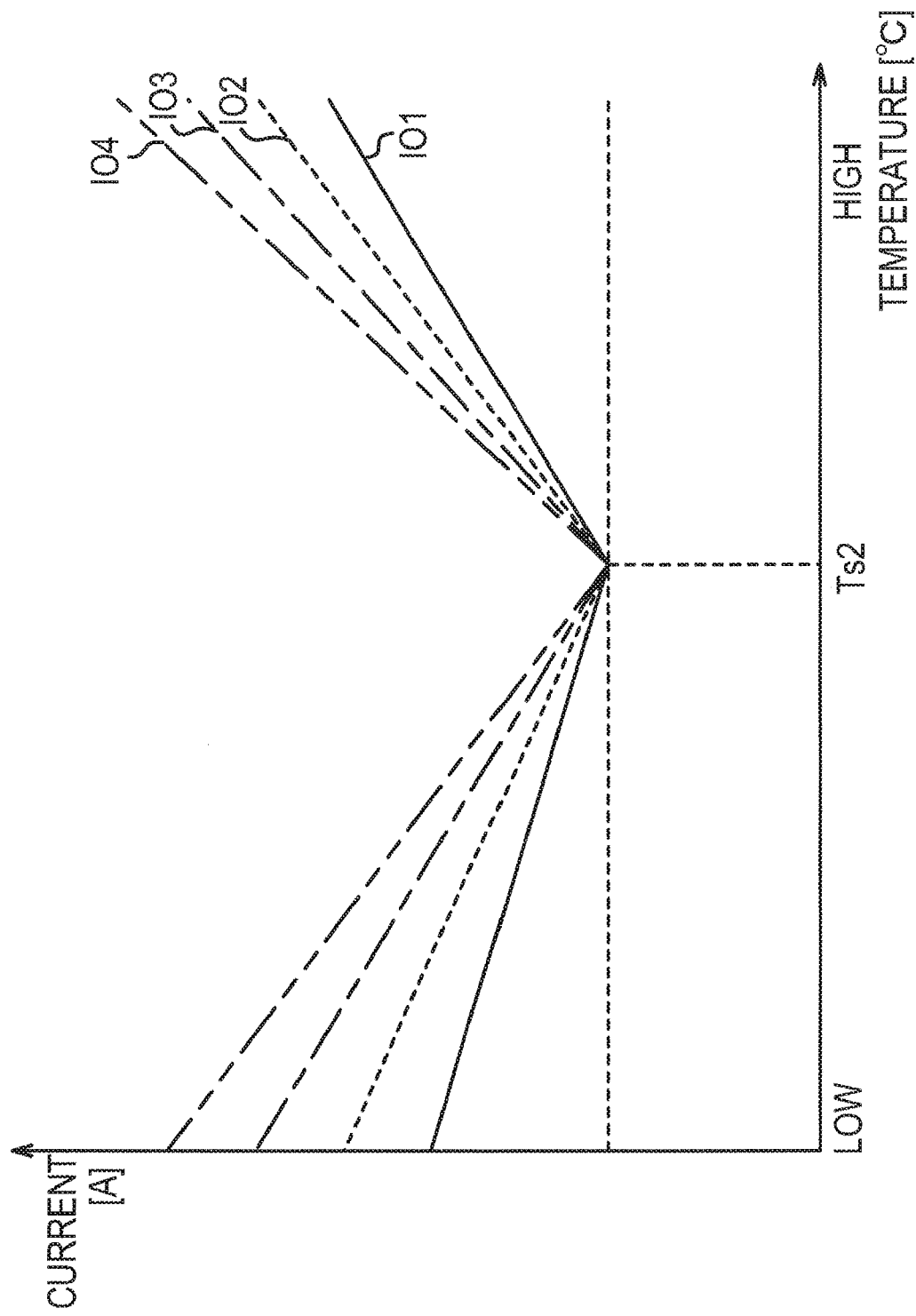
FIG. 18 is a view for explaining simulation result.

FIG. 18 depicts a simulation result of output currents IO1 to IO4 that are produced when the switches SP1 to SP3 and SM1 to SM3 are turned on in various combinations while the switches S2, SW1, and SW3 of FIG. 17 are turned on.

The output current IO1 is the result obtained in the case where the switches SP1 and SP2 are turned on (mirror coefficient is 3) while the switch SM1 is turned on (mirror coefficient is 1). The output current IO2 is the result obtained in the case where the switch SP3 is turned on (mirror coefficient is 4) while the switch SM2 is turned on (mirror coefficient is 2). The output current IO3 is the result obtained in the case where the switches SP1 and SP3 are turned on (mirror coefficient is 5) while the switches SM1 and SM2 are turned on (mirror coefficient is 3). The output current IO4 is the result obtained in the case where the switches SP2 and SP3 are turned on (mirror coefficient is 6) while the switch SM3 is turned on (mirror coefficient is 4).

As is clear from the result of FIG. 18, the mirror coefficient of the current sources 10a and 20a is adjusted by changing the combinations of the turned-on switches in the switches SP1 to SP3, which allows the control of the temperature gradient of the output current IO on the high temperature side of the switching temperature Ts2. The mirror coefficient of the current sources 10b and 20b is adjusted by changing the combinations of the turned-on switches in the switches SM1 to SM3, which allows the control of the temperature gradient of the output current IO on the high temperature side of the switching temperature Ts2. It is found that the temperature gradient of the output current IO becomes steeper with increasing mirror coefficient.

The current sources 10a, 10b, 20a, and 20b include the current mirror circuits whose current mirror ratios may be adjusted. The current mirror ratio may be adjusted by selectively switching the switches SP1 to SP3 and SM1 to SM3. The mirror coefficient is adjusted by adjusting the current mirror ratio, which allows the temperature gradient of the output current IC to be arbitrarily controlled. Accordingly, the degree of freedom may be enhanced in the temperature characteristic of the output current IO. The switches SP1 to SP3, and SM1 to SM3 are selectively switched based on the temperature characteristic of the change in resistance ΔRs of the correction target sensor element Rs, so that the output current IO may be produced according to the temperature characteristic of the change in resistance ΔRs. Accordingly, the correction accuracy may be improved with respect to the temperature characteristic of the change in resistance ΔRs of the correction target.

Figure 19:
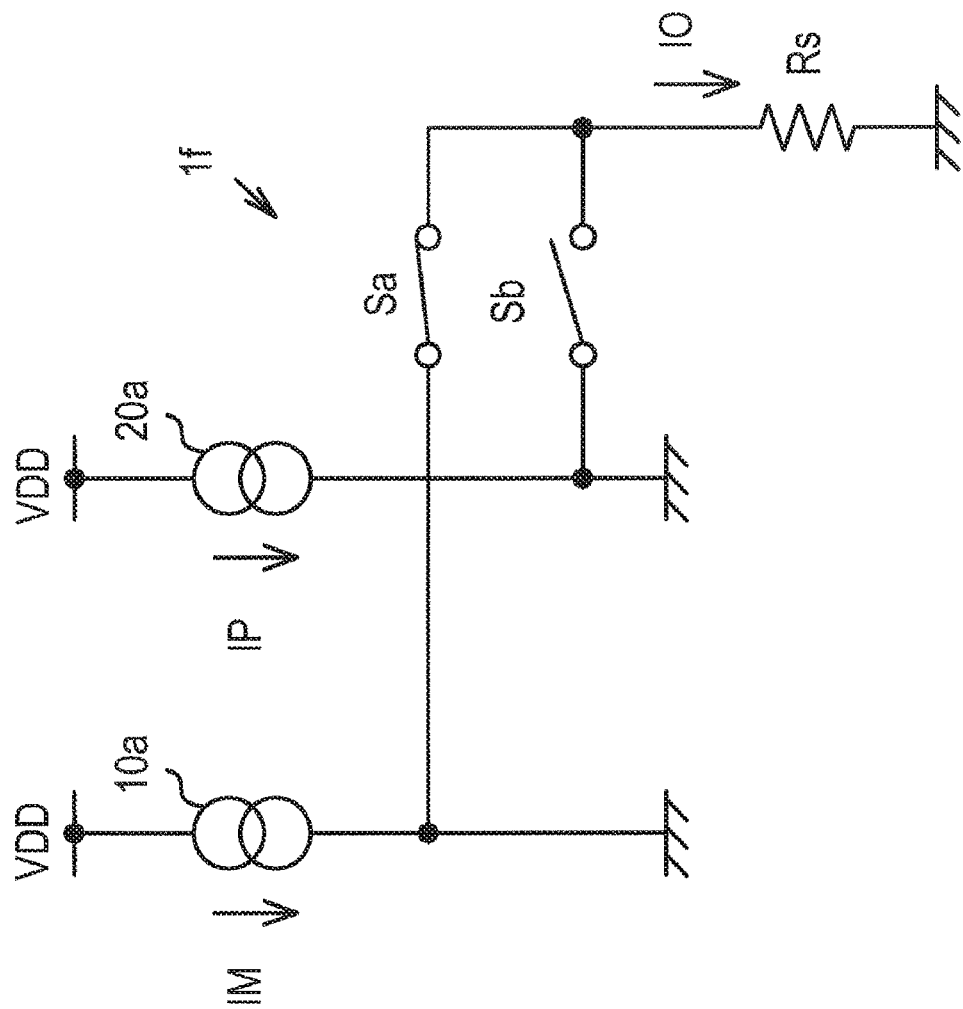
FIG. 19 is a circuit diagram depicting a current producing circuit according to a modification.

The embodiments may be implemented in the following mode in which the embodiments are appropriately changed. As depicted in FIG. 19, the first and second current sources 10a and 20a that pass first and second reference currents IM and IP having different temperature characteristics may be coupled to the node N2 through switches Sa and Sb, respectively. The switches Sa and Sb may be turned on and off at the desired switching temperature Ts in which the first and second reference currents IM and IP intersect each other. In such cases, the output current IO having the temperature characteristic in which the temperature gradient is changed at the switching temperature Ts may be produced.

Figure 20:
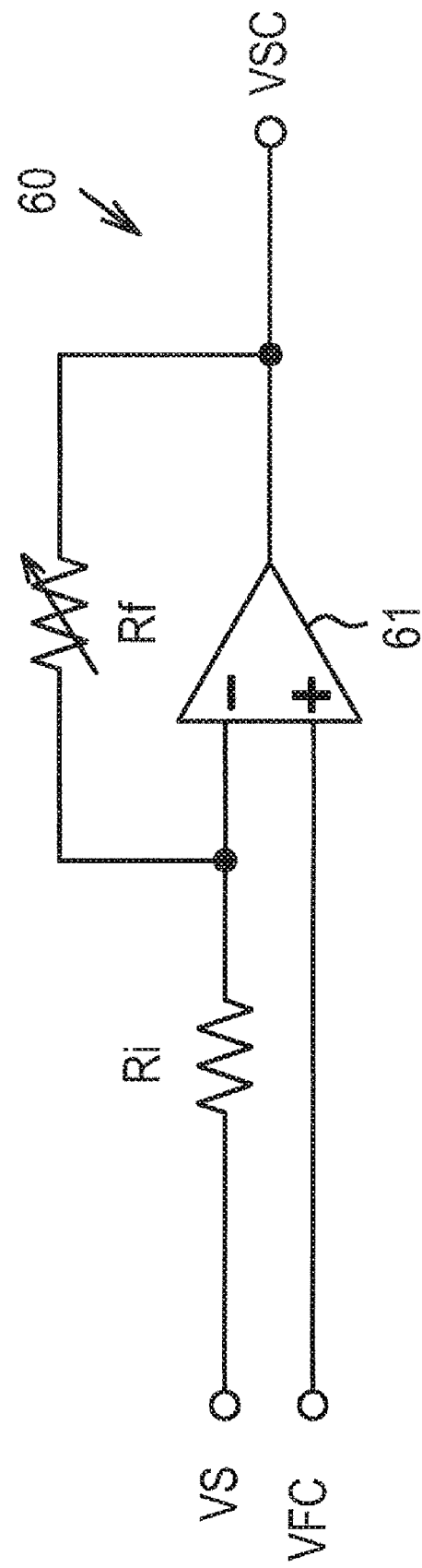
FIG. 20 is a circuit diagram depicting a reference voltage producing circuit according to a modification.

The second reference voltage producing circuit 24 in the third and fourth embodiments may be changed to a second reference voltage producing circuit 60 of FIG. 20. For example, the first correction reference voltage VFC is fed into a non-inverting input terminal of an operational amplifier 61 (amplifying circuit), and the second reference voltage VS is fed into an inverting input terminal through a resistor Ri. An output terminal of the operational amplifier 61 is fed back to the inverting input terminal of the operational amplifier 61 through a feedback resistor Rf including a variable resistor. In the thus configured second reference voltage producing circuit 60, the difference between the first correction reference voltage VFC and the second reference voltage VS may be amplified by a gain obtained by the resistor Ri and feedback resistor Rf, thereby producing the second correction reference voltage VSC. In the second reference voltage producing circuit 60, because the gain is adjusted by adjusting the resistance value of the feedback resistor Rf, temperature gradient of the second correction reference voltage VSC may arbitrarily be controlled. The resistance value of the feedback resistor Rf may be adjusted by the microcomputer 55 (see FIG. 8) based on the temperature characteristic of the change in resistance ΔRs of the sensor element Rs.

In the embodiments, the resistors Rb used to perform the current-voltage conversion in the constant current circuits 12, 22, 12a, 12b, 22a, and 22b are set to the substantially identical resistance value. Alternatively, the resistors Rb may have different resistance values.

In the embodiments, the first reference voltage VF and the first reference current IM have the temperature characteristic independent of the temperature. Alternatively, the first reference voltage VF and the first reference current IM may have temperature characteristics having specific temperature gradients.

In the embodiments, the third reference current IMS is substantially identical to the first reference current IM (fourth reference current IMb). Alternatively, for example, the third reference current IMS may substantially be identical to the second reference current IP (second reference current IPa or fifth reference current IPb). Alternatively, the third reference current IMS may be different from the first reference current IM or second reference current IP. At this point, the third reference current IMS may have a temperature characteristic having a specific temperature gradient.

In the fifth embodiment, the first reference current IM is commonly supplied to the first and second differential current producing circuits 3a and 3b. Alternatively, for example, the first and fourth reference currents IMa and IMb having different current values may be supplied to the first and second differential current producing circuits 3a and 3b respectively, as with the fifth embodiment.

In the third to fifth embodiments, the selective switching of the switches S1 to S4, S1a to S8a, S1b to S8b, SW1 to SW4, SM1 to SM3, and SP1 to SP3 and the resistance value setting of the feedback resistor Rf are controlled by the control signal SG supplied from the microcomputer 55. Therefore, the output current IO having the desired temperature gradient may be produced on a user side by utilizing the microcomputer 55. However, in addition to the microcomputer 55, the selective switching of the switches and the resistance value setting of the feedback resistor Rf may be performed based on a setting stored in a built-in memory, an external memory, or a register.

For example, the current producing circuits 1a to 1e may be applied to a resistance-change type sensor (such as pressure sensor and a magnetic sensor) mounted on electronic devices such as a blood pressure meter, an air conditioner, a watch, a water heater, an industrial robot, a plant monitoring device, a sheet sensor, or a car air-conditioner. Further, the current producing circuits 1a to 1e are applied to circuits, such as LED having the temperature characteristic and an amplifier of temperature compensation amplifier receiving device that amplifies a temperature fluctuating signal, in which the correction target signal has the temperature characteristic and the temperature characteristic may be corrected by the output current IO supplied from each of the current producing circuits 1a to 1e.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority. Although the embodiments of the present inventions have been described in detail, it should be understood that the various changes, substitutions, and alterations could be made hereto without departing from the spirit and scope.

What is claimed is:

1. A current producing circuit comprising:
   a first current source that applies a first current, the first current being changed at a first rate with respect to a temperature;
   a second current source that applies a second current, the second current being changed at a second rate with respect to the temperature, and the second rate being different from the first rate;
   a third current source that applies a third current, the third current being changed at a third rate with respect to the temperature;
   a fourth current source that applies a fourth current, the fourth current being changed at a fourth rate with respect to the temperature;
   a fifth current source that applies a fifth current, the fifth current being changed at a fifth rate with respect to the temperature and the fifth rate being different from the fourth rate;
   a first differential output unit that supplies a first differential current based on a difference between the first current and the second current;
   a differential output unit that supplies a second differential current based on a result of subtracting the fourth current from the fifth current;
   a computing unit that adds or subtracts the first differential current to or from the third current;
   a computing unit that adds or subtracts the second differential current to or from the third current;
   a first differential current producing circuit that produces a current with a temperature higher than a first temperature at a point where a current value of the first current and a current value of the second current intersect; and
   a second differential current producing circuit that produces a current with a temperature lower than a second temperature at a point where a current value of the fourth current and a current value of the fifth current intersect.

2. The current producing circuit according to claim 1, wherein the first differential output unit comprises:
   a MOS transistor whose drain is coupled to a coupling point of the first current source and the second current source; and
   another MOS transistor that is coupled to the MOS transistor in a current mirror manner.

3. The current producing circuit according to claim 1, wherein the first differential output unit comprises:
   a P-channel MOS transistor whose drain is coupled to a coupling point of the first current source and the second current source; and
   a P-channel MOS transistor that is coupled to the P-channel MOS transistor in a current mirror manner, and
   the second differential output unit includes:
   an N-channel MOS transistor whose drain is coupled to a coupling point of the fourth current source and the fifth current source; and
   another N-channel MOS transistor that is coupled to the N-channel MOS transistor in a current mirror manner.

4. The current producing circuit according to claim 1, wherein each of the current sources comprise a control circuit that performs control to apply each specific current, and
   the control circuit includes a constant current circuit that produces a current based on a reference voltage having a specific temperature characteristic.

5. The current producing circuit according to claim 4, wherein the control circuit comprises:
   a first reference voltage producing circuit that produces a first correction reference voltage based on a first reference voltage, the first reference voltage having a first temperature characteristic independent of a temperature;
   a second reference voltage producing circuit that produces a second correction reference voltage based on the first correction reference voltage and a second reference voltage, the second reference voltage having a second temperature characteristic;
   a third reference voltage producing circuit that produces a third correction reference voltage based on a third reference voltage, the third reference voltage having a third temperature characteristic;
   a fourth reference voltage producing circuit that produces a fourth correction reference voltage based on a fourth reference voltage, the fourth reference voltage having a fourth temperature characteristic independent of the temperature; and
   a fifth reference voltage producing circuit that produces a fifth correction reference voltage based on the fourth correction reference voltage and a fifth reference voltage, the fifth reference voltage having a fifth temperature characteristic.

6. The current producing circuit according to claim 5, wherein the first reference voltage producing circuit comprises a voltage dividing circuit that produces a divided voltage as the first correction reference voltage, the divided voltage being obtained by dividing the first reference voltage at a variable dividing ratio, the fourth reference voltage producing circuit comprises a voltage dividing circuit that produces a divided voltage as the fourth correction reference voltage, the divided voltage being obtained by dividing the fourth reference voltage at a variable dividing ratio, and the constant current circuit comprises a circuit that produces the first current based on the first correction reference voltage and a circuit that produces the fourth current based on the fourth correction reference voltage.

7. The current producing circuit according to claim 5, wherein the second reference voltage producing circuit comprises a voltage dividing circuit that produces a divided voltage as the second correction reference voltage, the divided voltage being obtained by dividing a potential difference between the second reference voltage and the first correction reference voltage at a variable dividing ratio, the fifth reference voltage producing circuit comprises a voltage dividing circuit that produces a divided voltage as the fifth correction reference voltage, the divided voltage being obtained by dividing a potential difference between the fifth reference voltage and the fourth correction reference voltage at a variable dividing ratio, and the constant current circuit comprises a circuit that produces the second current based on the second correction reference voltage and a circuit that produces the fifth current based on the fifth correction reference voltage.

8. The current producing circuit according to claim 5, wherein the second reference voltage producing circuit comprises an amplifying circuit that has a feedback resistor, the feedback resistor including a variable resistor, the amplifying circuit amplifying a difference between the first correction reference voltage and the second reference voltage based on a gain set by the feedback resistor, the fifth reference voltage producing circuit comprises an amplifying circuit that has a feedback resistor, the feedback resistor including a variable resistor, the amplifying circuit amplifying a difference between the fourth correction reference voltage and the fifth reference voltage based on a gain set by the feedback resistor, and the constant current circuit comprises a circuit that produces the second current based on the second correction reference voltage and a circuit that produces the fifth current based on the fifth correction reference voltage.

9. The current producing circuit according to claim 1, wherein each current source comprises a current mirror circuit to adjust a current mirror ratio.

10. The current producing circuit according to claim 1, comprising:
a switch that selects addition or subtraction of the first differential current to or from the third current; and
a switch that selects addition or subtraction of the second differential current to or from the third current.

11. An electronic device comprising the current producing circuit according to claim 1, wherein the temperature characteristic of a signal is corrected by the current produced by the current producing circuit.

12. A current producing method comprising:
supplying a first differential current based on a difference between a first current and a second current, the first current being changed at a first rate with respect to a temperature, the second current being changed at a second rate with respect to the temperature, and the second rate being different from the first rate, wherein the first differential current has a temperature higher than a first temperature at a point where a current value of the first current and a current value of the second current intersect;
supplying a second differential current base on a difference between a fourth current and a fifth current, the fourth current being changed at a fourth rate with respect to the temperature, the fifth current being changed at a fifth rate with respect to the temperature and the fifth rate being different from the fourth rate, wherein the second differential current has a temperature lower than a second temperature at a point where a current value of the fourth current and a current value of the fifth current intersect;
adding or subtracting the first differential current to or from a third current, the third current being changed at a third rate with respect to the temperature; and
adding or subtracting the second differential current to or from the third current.

* * * * *